(12) United States Patent
Raghavan et al.

(10) Patent No.: US 12,184,365 B2
(45) Date of Patent: Dec. 31, 2024

(54) DYNAMIC POLARIZATION COMBINATIONS BASED ON BLOCKAGE SCENARIOS

(71) Applicant: QUALCOMM Incorporated, San Diego, CA (US)

(72) Inventors: Vasanthan Raghavan, West Windsor Township, NJ (US); Sinan Adibelli, San Diego, CA (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/328,703

(22) Filed: Jun. 2, 2023

(65) Prior Publication Data
US 2024/0405817 A1   Dec. 5, 2024

(51) Int. Cl.
*H04B 7/0456* (2017.01)
*H04B 7/0404* (2017.01)
*H04B 17/336* (2015.01)

(52) U.S. Cl.
CPC ........ *H04B 7/0469* (2013.01); *H04B 7/0404* (2013.01); *H04B 17/336* (2015.01)

(58) Field of Classification Search
CPC ... H04B 7/0469; H04B 7/0404; H04B 17/336
USPC ....................................................... 375/277
See application file for complete search history.

(56) References Cited

U.S. PATENT DOCUMENTS

| 2014/0343891 | A1 | 11/2014 | Becker et al. | |
| 2020/0314934 | A1 | 10/2020 | Raghavan et al. | |
| 2022/0159491 | A1* | 5/2022 | Svendsen | H04W 24/08 |
| 2022/0209832 | A1* | 6/2022 | Raghavan | H04B 7/0452 |
| 2022/0394506 | A1 | 12/2022 | Raghavan et al. | |

OTHER PUBLICATIONS

Partial International Search Report—PCT/US2024/025408—ISA/EPO—Sep. 2, 2024.
International Search Report and Written Opinion—PCT/US2024/025408—ISA/EPO—Oct. 23, 2024.

* cited by examiner

*Primary Examiner* — Fitwi Y Hailegiorgis
(74) *Attorney, Agent, or Firm* — Haynes and Boone, LLP/Qualcomm Incorporated

(57) ABSTRACT

A dual-polarized multiple-input-multiple-output (MIMO) mobile device is provided that includes a first array of antennas and a second array of antennas. Based upon a blockage of at least one of the array of antennas being less than a blockage threshold, the mobile device operates in a default configuration in which a default polarization selection from the second array is used in combination with a fixed polarization selection from the first array to form a first MIMO layer signal and a second MIMO layer signal. Should the blockage exceed the blockage threshold and an optional performance threshold be satisfied, the mobile device may operate in a dynamic configuration in which a dynamic polarization selection from the second array is reversed as compared to the default polarization selection.

30 Claims, 12 Drawing Sheets

DYNAMIC POLARIZATION COMBINATIONS BASED ON BLOCKAGE SCENARIOS

FIELD OF TECHNOLOGY

The present disclosure relates generally to wireless communications and more specifically to a dynamic polarization combination.

BACKGROUND

Modern wireless communication systems such as fifth generation (5G) target ever higher data rates. To provide the bandwidth for these increased data rates, 5G has expanded to the millimeter wave bandwidths (e.g., from 24.25 GHz to 71 GHZ) and may be focused on even higher carrier frequencies as 5G evolves. At these high frequencies, the antenna unit cell is commensurate with the reduced wavelengths such that a cellular phone may include multiple antenna elements in an antenna array, with each antenna providing dual-polarized coverage (e.g., both a co-polarized and a cross-polarized response). The use of at least two antenna arrays having this polarization orthogonality property provides the additional data transmission advantage of dual-polarized multiple-input-multiple-output (MIMO) techniques. In dual-polarized MIMO, one data stream (a first layer) is transmitted using a co-polarized antenna array whereas another data stream (a second layer) is transmitted using a cross-polarized antenna array.

SUMMARY

The following summary discusses some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, a dual-polarized multiple-input-multiple-output (MIMO) mobile device is provided that includes: a first array of antennas configured to receive a first co-polarized received signal and a first cross-polarized received signal; a second array of antennas configured to receive a second co-polarized received signal and a second cross-polarized received signal; a first selector configured to select between the second co-polarized received signal and the second cross-polarized received signal to form a first selected signal; a first combiner configured to combine the first co-polarized received signal with the first selected signal to form a first MIMO layer received signal; a blockage sensor configured to detect a blockage of at least one of the first array of antennas and the second array of antennas; and a controller configured to control the first selector to select for the second co-polarized received signal responsive to the blockage being less than a blockage threshold.

In accordance with another aspect of the disclosure, a dual-polarized multiple-input-multiple-output (MIMO) mobile device is provided that includes: a first array of antennas configured to receive a first co-polarized received signal and a first cross-polarized received signal; a second array of antennas configured to receive a second co-polarized received signal and a second cross-polarized received signal; a first selector configured to select between the second co-polarized received signal and the second cross-polarized received signal to form a first selected signal; a first combiner configured to combine the first co-polarized received signal with the first selected signal to form a first MIMO layer signal; a blockage sensor configured to detect a blockage of at least one of the first array of antennas and the second array of antennas; and a controller configured to control the first selector to select for the second cross-polarized received signal responsive to the blockage being less than a blockage threshold.

In accordance with yet another aspect of the disclosure, a dual-polarized multiple-input-multiple-output (MIMO) method is provided that includes: receiving a first co-polarized signal and a first cross-polarized signal at a first array of antennas; receiving a second co-polarized signal and a second cross-polarized signal at a second array of antennas; sensing a blockage of at least one of the first array of antennas and of the second array of antennas; combining the first co-polarized signal and the second co-polarized signal to form a first MIMO layer signal in response to the blockage being less than a blockage threshold; and combining the first co-polarized signal and the second cross-polarized signal to form the first MIMO layer signal in response to the blockage being greater than the blockage threshold.

Finally, in accordance with another aspect of the disclosure, a dual-polarized multiple-input-multiple-output (MIMO) method is provided that includes: receiving a first co-polarized signal and a first cross-polarized signal at a first array of antennas; receiving a second co-polarized signal and a second cross-polarized signal at a second array of antennas; combining the first co-polarized signal and the second cross-polarized signal to form a first MIMO layer signal in a first mode; combining the first co-polarized signal and the second co-polarized signal to form the first MIMO layer signal in second mode; and switching between the first mode and the second mode based on a blockage scenario for the first array of antennas or for the second array of antennas.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

DETAILED DESCRIPTION

Figure 1:
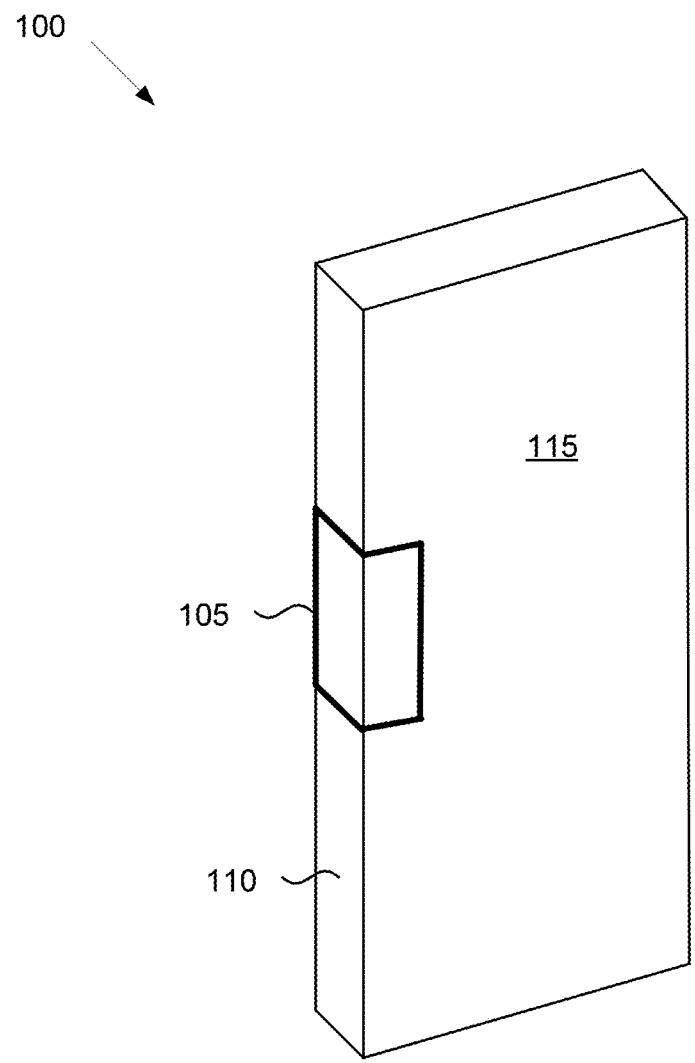
FIG. 1 illustrates a dual-polarized MIMO mobile device with an L-shaped antenna module in accordance with an aspect of the disclosure.

At millimeter wave frequencies such as those between 24.25 GHz to 71 GHz or higher, electromagnetic waves tend to propagate akin to visible light such that the propagation is readily blocked or reflected by obstructions. In contrast, for radio frequency (RF) signals at lower frequencies, the electromagnetic waves tend to diffract around obstructions. The resulting difference in RF propagation depending upon frequency affects how MIMO is implemented. At lower frequencies such as the FR1 range of frequencies, multipath can be exploited by spatial MIMO such that one data stream/MIMO layer is transmitted on a line-of-sight path whereas another MIMO layer is transmitted on a non-line-of-sight path. Although multipath exists even at millimeter wave frequencies, the angular spread of RF propagation from a transmitter to a receiver is reduced due to the more-light-like propagation of RF at such higher frequencies. Thus, dual-polarized MIMO is an attractive alternative to spatial MIMO for communication in the millimeter wave spectrum.

In a typical dual-polarized MIMO application, a transceiver transmits and receives through a first dual-polarized antenna array and a second dual-polarized antenna array according to a fixed polarization combination for the MIMO layers. The antennas in the dual-polarized antenna arrays may each be configured so that they transmit and receive co-polarized radio frequency waves such as a first linear polarization and so that they transmit and receive cross-polarized radio frequency waves having a second linear polarization that is orthogonal to the first linear polarization. More generally, a co-polarization may be a right-handed circular/elliptical polarization whereas a cross-polarization may be a left-handed circular/elliptical polarization. Other possibilities include vertical and horizontal polarization, slant 45 degrees and slant-45 degrees polarization, etc. Depending upon the implementation, an antenna array may include a first sub-array of antennas for receiving and transmitting a first polarized RF waveform and a second sub-array of antennas for receiving and transmitting a second polarized RF waveform. Each antenna is thus specialized for either one polarization or the other. Alternatively, each antenna may be configured as a dual-polarized antenna including both a cross-polarized feed and a co-polarized feed. Although only the RF waveforms propagating from or to the mobile device have a polarization, the resulting received signals from the co-polarized antenna feeds are denoted herein as co-polarized received signals. For example, a signal received from a co-polarized antenna port may be denoted herein as a co-polarized received signal. Similarly, a signal from a cross-polarized feed may be denoted as a cross-polarized received signal. A similar terminology is used herein for the transmitted RF signals. For example, a signal driving a co-polarized feed of an antenna may be denoted herein as a co-polarized transmit signal. Similarly, a signal driving a cross-polarized feed of an antenna may be denoted herein as a cross-polarized transmit signal.

The following discussion will be directed to implementations in which the antennas are dual-polarized antennas but it will be appreciated that single-polarized antenna implementations (each array thus including single-polarized antennas for the co-polarized signals and single-polarized antennas for the cross-polarized signals, or some antennas being dual-polarized and some other antennas being single-polarized) may also be used. In a default configuration (which may also be designated as a default polarization selection mode or a first mode) for a dual-polarized MIMO mobile device during a receive operation, a first combiner may combine the co-polarized signals from the first array with the co-polarized signals from the second array to produce a first MIMO layer RF signal. The first MIMO layer RF signal may then be processed and down-converted to baseband so that the data stream for the first layer may be recovered. Alternatively, the first MIMO layer RF signal may be formed from a combination of the co-polarized signals from the first array with the cross-polarized signals from the second array during the default configuration.

Similarly, a second combiner may combine the cross-polarized signals from the first array with the cross-polarized signals from the second array to form a second MIMO layer RF signal during the default configuration. Alternatively, the second MIMO layer RF signal may be formed from a combination of the cross-polarized signals from the first array with the co-polarized signals from the second array while the dual-polarized MIMO mobile device operates in the default configuration. Analogous to the first combined signal, the second MIMO layer RF signal is then processed and down-converted to baseband so that the data stream from the second layer may be recovered.

The default configuration is active while at least one (or both) of the arrays has a blockage below a blockage threshold. With regard to such blockage, various proximity sensors have been developed so that a cellular telephone may detect if a user's body such as the fingers or palm is blocking a given antenna. For example, a mobile device may be configured with a frequency-modulated continuous-wave radar sensor for detecting human blockage of the mobile device's antennas. Alternatively, the mobile device may include capacitive or near-field sensors to determine whether human blockage exists such as caused by the user's fingers or palm. Other example sensors include impedance sensors, proximity sensors, etc.

A mobile device is disclosed herein that exploits the use of such blockage sensors (which may also be implemented through signal processing and inference approaches/mechanisms based on sensing data) to detect whether the device's antennas are blocked (as used herein, "blocked" refers to human blockage of a mobile device's antennas such as caused by a user's fingers, palm, or hand). Should there be no (or low) blockage detected, the handset operates in the default configuration. In the following discussion, it will be assumed that in the default configuration the first MIMO layer RF signal is formed from a combination of the co-polarized signals from a first array of antennas with the co-polarized signals from a second array of antennas. Similarly, the second MIMO layer RF signal is formed in the default configuration from a combination of the cross-polarized signals from the first array of antennas with the cross-polarized signals from the second array of antennas. It will be appreciated, however, that the mobile device in the default configuration could instead combine the co-polarized signals from one array with the cross-polarized signals from the other array in alternative implementations. Regardless of the actual selection, the resulting polarization selection during the default configuration does not change so long as the blockage does not exceed a blockage threshold. But the polarization selection at the combiners from one of the arrays may be switched in a dynamic configuration (which may also be denoted as a second mode) should the blockage exceed the blockage threshold.

The default and dynamic configurations will first be discussed herein with regard to a receive operation (which may also be denoted as a downlink operation) followed by a discussion of a transmit operation (which may also be denoted as an uplink operation). With regard to the downlink and uplink, they may be simultaneous such as in a full duplex mode or may be consecutive such as in a time division duplex mode. Each active antenna in the first and second arrays has a co-polarized feed that receives a co-polarized signal and has a cross-polarized feed that receives a cross-polarized signal. In one implementation of the default configuration, a first combiner combines the co-polarized signals from the active antennas in the two arrays. The first combiner may thus be denoted as a co-polarized combiner since that is its default role. Similarly, a second combiner combines the cross-polarized signals from the active antennas in the two arrays. The second combiner may thus be denoted as a cross-polarized combiner since that is its role while the default configuration is active. The signal formed at each combiner is denoted herein as a MIMO layer RF signal. There is thus a first MIMO layer RF signal from the first combiner and a second MIMO layer RF signal from the second combiner.

Regardless of whether blockage is detected or not, the first array's coupling to the two combiners is not changed. But in an implementation of the dynamic configuration, the first combiner combines the cross-polarized signals from the active antennas in the second array with the co-polarized signals from the active antennas in the first array. Similarly, the second combiner combines the cross-polarized signals from the active antennas in the first array with the co-polarized signals from the active antennas in the second array while the dynamic configuration is active. A first switch array denoted as a first selector thus couples between the second array and the first combiner. In one implementation of the default configuration, the first selector selects for the co-polarized signals from the active antennas in the second array. But in the dynamic configuration, the first selector would instead select for the cross-polarized signals from the active antennas in the second array.

A second switch array denoted as a second selector couples between the second array of antennas and the second combiner. In one implementation of the default mode, the second selector selects for the cross-polarized signals from the active antennas in the second array. But in the dynamic configuration or mode, the second selector would instead select for the co-polarized signals from the active antennas in the second array. The selection at the selectors thus switches in the dynamic mode of operation.

Whether the dual-polarized MIMO mobile device operates in the default or dynamic configurations may depend upon the blockage threshold. In such an implementation, should the blockage exceed the blockage threshold, the mobile device switches from the default configuration to the dynamic configuration. The resulting implementation may thus be denoted as a single threshold implementation since whether the dynamic mode or the default mode is active depends on whether the blockage exceeds the blockage threshold. In an alternative implementation, the mobile device performs a performance measurement on one or both of the MIMO layer signals to determine whether the mobile device should switch from the default configuration to the dynamic configuration while the blockage exceeds the blockage threshold. The performance measurement of a dual-polarized MIMO layer signal may be a signal quality or a signal strength measurement. A signal strength measurement may also be denoted as a signal power measurement as it is typically expressed in dBm and relates to the signal level as received at the modem. An example signal strength measurement is a reference signal received power (RSRP) measurement, which is the sum power of rank-1 pilot signals transmitted over dual polarizations to a mobile device from a base station. Alternatively, a reference signal received quality (RSRQ) measurement may be performed, which characterizes the quality of the base station pilot signals. Alternatively, the performance measurement may constitute a signal-to-noise-ratio (SNR) measurement or a signal-to-interference-and-noise-ratio (SINR) measurement. It will thus be appreciated that there are numerous ways in which a mobile device may determine or measure the performance resulting from a given polarization selection so as to then compare the performance to a performance threshold. The resulting implementation may thus also be denoted herein as a dual threshold implementation since it uses both a blockage threshold and a performance threshold.

In a dual threshold implementation, the mobile device may compare a first signal performance measurement for one (or both) of the MIMO layer signals during the default configuration in the presence of the blockage to a second signal performance for the MIMO layer(s) during the dynamic configuration in the presence of the blockage. Since the first signal performance measurement occurs with the mobile device in the default configuration, the first signal performance measurement may also be denoted herein as a fixed signal performance measurement. Similarly, the second signal performance measurement may also be denoted herein as a dynamic signal performance measurement since the second signal performance measurement occurs with the mobile device in the dynamic configuration. Should the dynamic signal performance measurement be greater than the fixed signal performance measurement by the performance threshold, the mobile device proceeds to operate in the dynamic configuration while the blockage exceeds the blockage threshold in the second implementation. Conversely, if the dynamic signal performance measurement is not greater than the fixed signal performance measurement by the performance threshold, the mobile device remains in the default configuration despite the blockage remaining above the blockage threshold in a dual-threshold implementation.

Regardless of whether the mobile device uses the single threshold or the dual threshold implementation, the second array of antennas couples to the combiners through corresponding polarization selectors so that the polarization selection from the second array of antennas may be switched in a transition from the default configuration to the dynamic configuration. Note that signals from the first array do not need any polarization selectors or switches since the polarization selection for the first array is fixed. Should the default configuration for a MIMO layer signal be a co-polarized selection from both arrays, the co-polarized signals from the active antennas in the second array do not couple to the co-polarized combiner after a transition to the dynamic configuration but instead are combined at the cross-polarized combiner with the cross-polarized signals from the active antennas in the first array. Similarly, the cross-polarized signals from the active antennas in the second array would instead be combined at the co-polarized combiner with the co-polarized signals from the active antennas in the first array during operation of the mobile device in the dynamic configuration. It will be understood that other implementations (e.g., having polarization selectors and/or switches coupled to both arrays) are possible. In some such other implementations, however, additional hardware that is included as compared to the implementation described above may introduce additional signal loss.

Figure 7A:
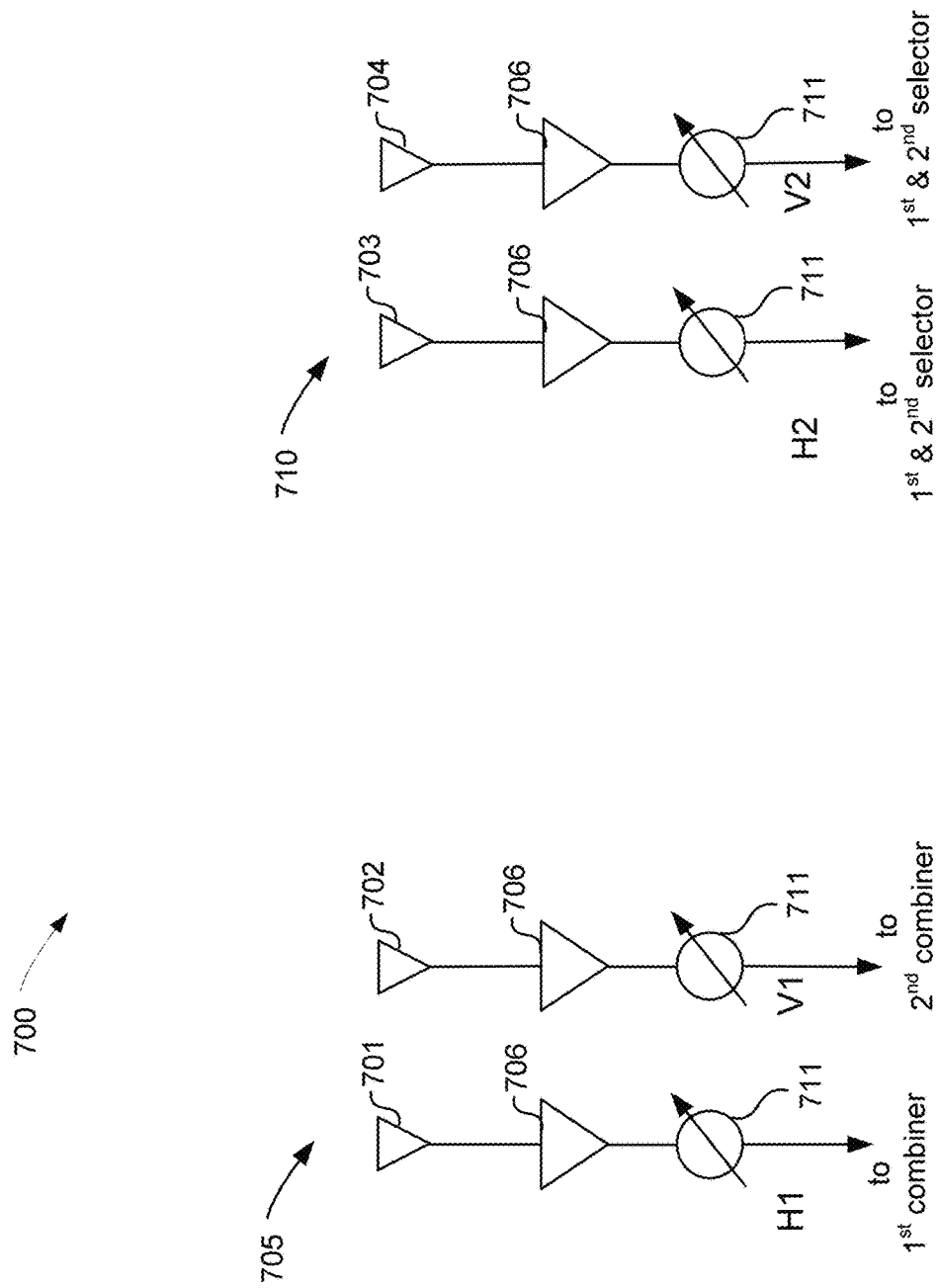
FIG. 7A illustrates receive first and second antenna arrays of a dual-polarized MIMO mobile device and associated low-noise amplifiers and phase-shifters in accordance with an aspect of the disclosure.

It will be appreciated that any suitable first and second array of antennas may be used in the dynamic polarization combination disclosed herein. The following discussion will thus be directed to an L-shaped antenna module for the first and second antenna arrays without loss of generality. As implied by its name, an L-shaped antenna module arranges the first array of antennas in a first plane that is orthogonal to a second plane in which the second array of antennas is arranged. For a mobile device such as a typical smartphone, such an L-shaped antenna module may be integrated into the smartphone housing such that one of the arrays is parallel with and adjacent to the edge of the smartphone housing whereas the remaining one of the arrays is parallel to an adjacent portion of the back of the smartphone housing (the front of the smartphone housing thus being reserved for the touchscreen display). In alternative implementations, antennas such as transparent antennas may be configured to radiate out of the front surface of the smartphone. The following discussion will assume without loss of generality that it is the first array that is aligned with the housing edge but it will be appreciated that it is arbitrary as to whether an array is designated as being a first array or a second array. It will be appreciated that the following discussion of an L-shaped antenna module is for illustrative purposes and is not limiting. Alternative implementations may thus use non-L-shaped antenna modules such as multi-sided modules for multiple boresight directions. Further, it will be understood that the discussion of an antenna module is merely exemplary. Instead of the two arrays being packaged together in a module, the arrays may be separately implemented. When one or both arrays are packaged in a module, the module may further include circuitry (e.g., as illustrated in FIGS. 7A and/or 7E) for processing millimeter wave signals.

An example smartphone 100 with an L-shaped antenna module 105 is shown in FIG. 1. A housing for the smartphone 100 is generally a flattened slab-shaped cuboid having a planar back surface 115 and an opposing planar front surface (not illustrated). A first portion of the L-shaped antenna module 105 is adjacent to and parallel with an edge 110 (e.g., a side, top, or bottom edge) of the housing. Similarly, a second portion of the L-shaped antenna module 105 is adjacent to and parallel with the back surface 115. In this fashion, the L-shaped antenna module 105 avoids the housing's front surface as this front surface is typically dominated by a touchscreen or display. The number and size of the antennas in the L-shaped antenna module 105 depend upon a number of factors which may include the frequency band. Some example L-shaped antenna modules will now be discussed in more detail. While examples are provided herein of a smartphone, other form factors (e.g., a tablet, laptop, foldable/flippable phones with dynamic form factors/configurations, etc.) may be implemented.

Figure 2:
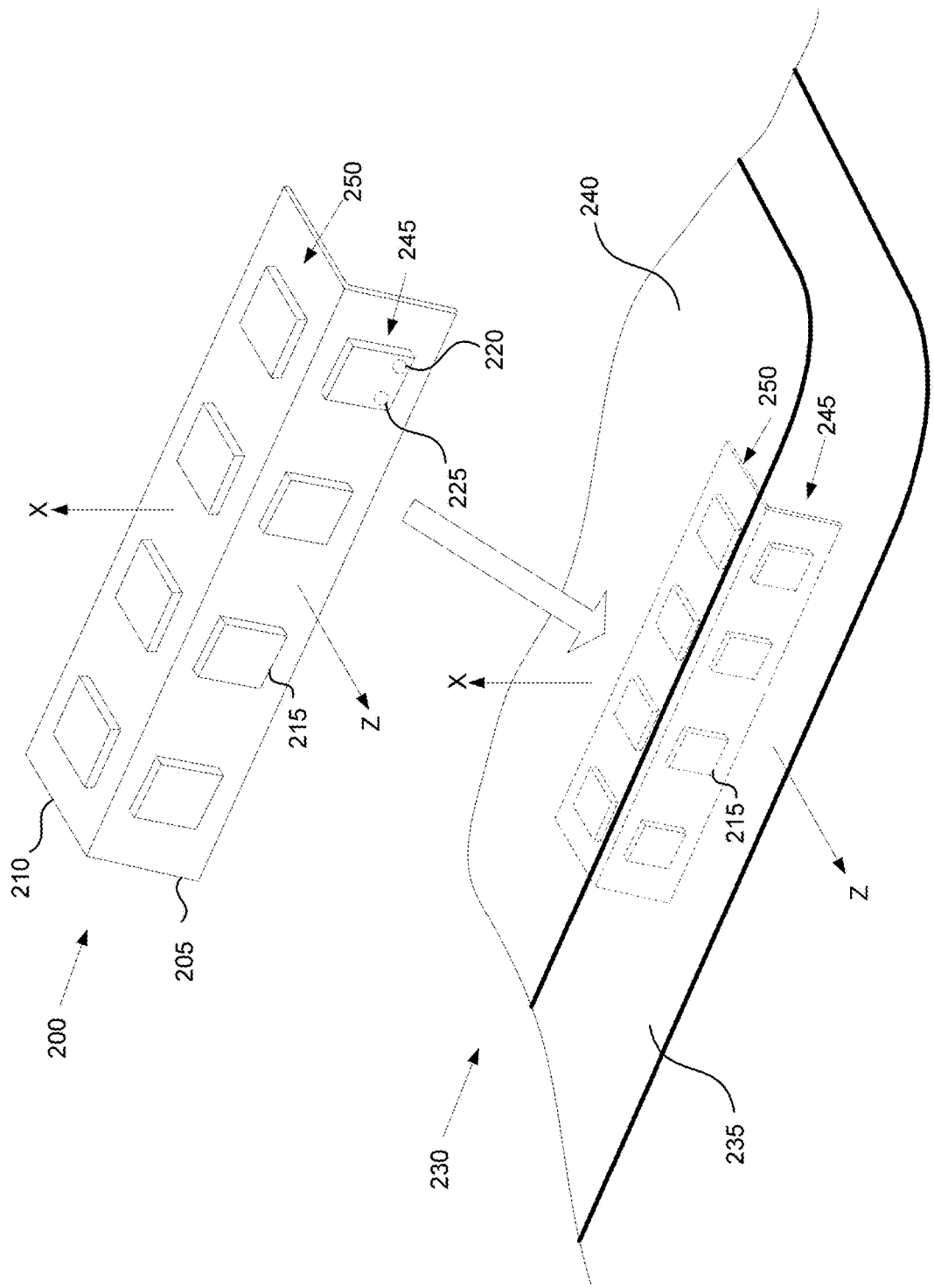
FIG. 2 illustrates a portion of a dual-polarized MIMO mobile device with an L-shaped antenna module configured for operation at 28 GHz in accordance with an aspect of the disclosure.

An example L-shaped antenna module 200 for operation in a frequency band from 24 GHz to 43 GHZ (within the FR2-1 band) is shown in FIG. 2. A 4×1 array 245 of antennas 215 are arranged adjacent or on/in a first substrate 205. In this implementation, antennas 215 are patch antennas although it will be appreciated that any suitable antenna topology may be used herein. The antennas 215 are formed in a metal layer so as to be parallel with or flat within the first substrate 205. A second substrate 210 that defines a plane that is orthogonal to a plane defined by the first substrate 205 supports another 4×1 array 250 of antennas 215. In some aspects, the substrates may share a layer (e.g., a connecting layer). Given this orthogonal arrangement of the arrays, a boresight direction of the antenna array 245 may be deemed to be aligned with a Cartesian Z axis whereas a boresight direction of the antenna array 250 is aligned with the X axis for illustration purposes. Each antenna 215 is driven by two feeds for a dual-polarized operation. For illustration clarity, these feeds are shown for just a single antenna 215. A first feed 225 supports a co-polarized transmission and reception whereas a second feed 220 supports a cross-polarized transmission and reception. A fewer or greater number of antennas (e.g., 2 or 5 or a different number) may be included in each of the arrays 245, 250. In some aspects, the substrates 205, 210 are disposed at an angle other than 90 degrees.

Each patch antenna 215 may correspond to a unit area cell that is the radiating element. Given the arrangement of the feeds 225 and 220 adjacent corresponding corners of this unit area, it may be seen that each first feed excites (during transmission) and receives a linearly-polarized RF signal that is aligned at a 45° angle with respect to the X axis. In such an implementation, the co-polarized signal is thus a 45° linearly-polarized signal. Conversely, each second feed 220 excites and receives a linearly-polarized RF signal that is aligned at a −45° with respect to the X axis so that the cross-polarized signal is a −45° linearly-polarized signal. The orientation of the co-polarized and cross-polarized signals may be varied from these alignments in alternative implementations. A portion of cellular phone including a cellular phone housing 230 is also shown in FIG. 1. With the antenna module 200 integrated into the cellular phone, it may be seen that the array 245 is parallel to and adjacent an edge 235 of the cellular phone housing 230. Similarly, array 250 is parallel to and adjacent a back side 240 of the cellular phone housing 230.

Figure 3:
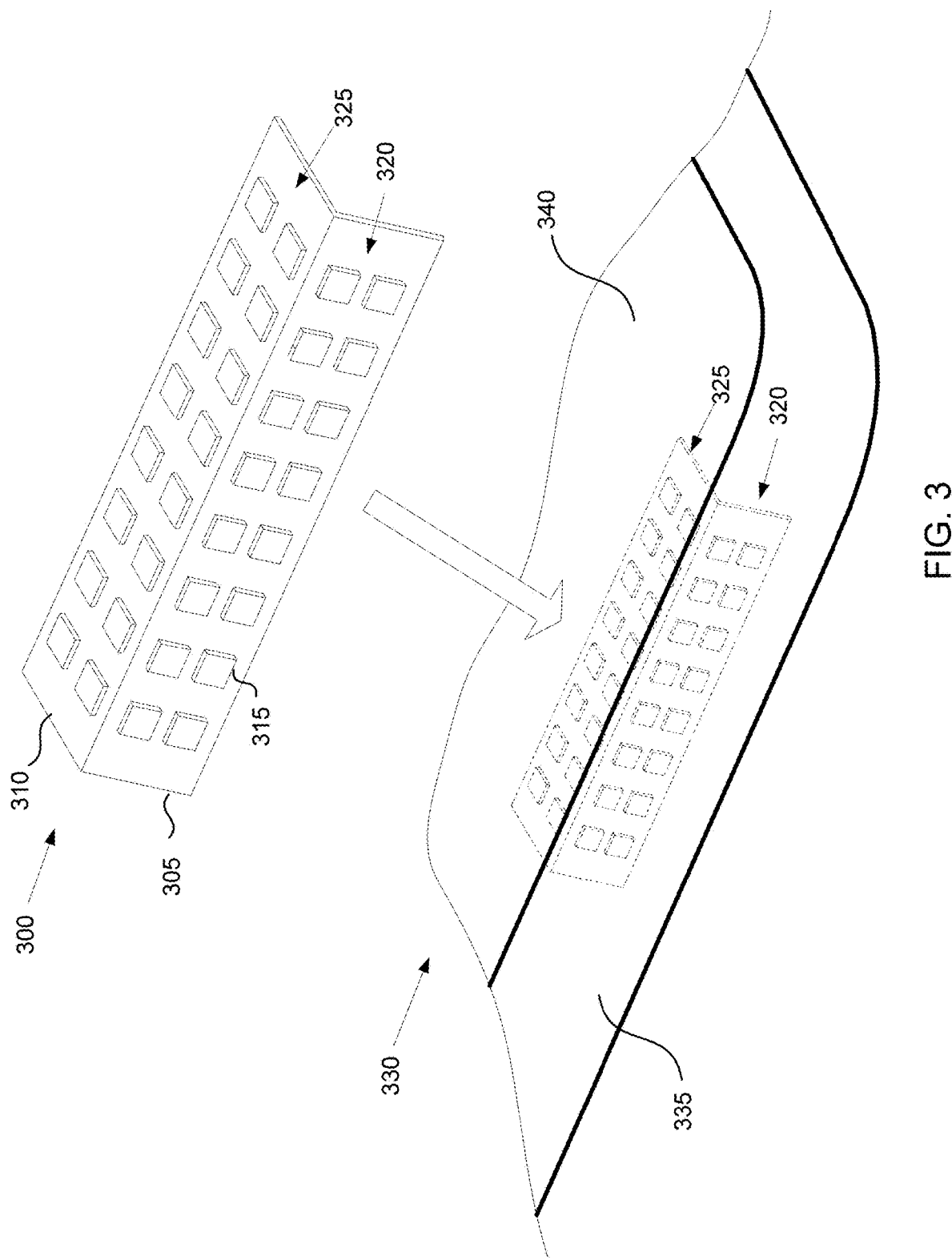
FIG. 3 illustrates a portion of a dual-polarized MIMO mobile device with an L-shaped antenna module configured for operation at 57-63 GHz in accordance with an aspect of the disclosure.

Another example L-shaped antenna module 300 for operation in a frequency band from 52.6 GHz to 71 GHZ (within the FR2-2 band) is shown in FIG. 3. An 8×2 array 320 of antennas 315 are arranged adjacent or on/in a substrate 305. In this implementation, antennas 315 are again patch antennas although it will be appreciated that any suitable antenna topology may be used herein. The antennas 315 are formed in a metal layer so as to be parallel with or planar within a first substrate 305. A second substrate 310 that defines a plane that is orthogonal (or at another angle in other examples) to a plane defined by the first substrate 305 supports another 8×2 array 325 of antennas 315. Given this arrangement, a boresight direction for the antenna array 320 is orthogonal to a boresight direction for the antenna array 325. In some aspects, the substrates may share a layer (e.g., a connecting layer). Each antenna 315 is driven by two feeds (not illustrated) for a dual-polarized operation analogously as discussed for antenna module 200. A portion of a cellular phone housing 330 is also shown in FIG. 3. With the antenna module 300 integrated into the cellular phone housing 330, it may be seen that the antenna array 320 is parallel to and adjacent an edge 335 of the cellular phone housing 330. Similarly, the antenna array 325 is parallel to and adjacent a back side 340 of the cellular phone housing 330.

Each of the antennas 215, 315 is described above as supporting either the FR2-1 or FR2-2 band. In other aspects, each antenna may support only a portion of its respective range. For example, an antenna may be configured to support a lower portion (e.g., 24 GHZ-30 GHZ) of one of these bands, or another band. In some such aspects, these antennas are disposed adjacent (e.g., interleaved with) or disposed in a stacked configuration with antennas configured to support another portion (e.g., an upper portion such as 37-43 GHz, or another band). Thus, multiple sets of feeds may be utilized (e.g., for a plurality of antenna arrays, which may be stacked and therefore occupy the same space on the substrate when viewed from the boresight direction). These antennas/arrays may be treated similarly with respect to operations described below (e.g., all antennas will be treated the same with respect to whether a default or dynamic mode is used). In other examples, whether to use a dynamic or default mode is determined independently for each array or set of antennas (e.g., such that antennas supporting one frequency range may use the same or different mode as antennas supporting another frequency range). Similarly, the examples in FIGS. 2 and 3 may be included on the same substrate or in the same antenna modules, for example in a laterally displaced configuration or a stacked configuration with respect to each other. Other frequencies may also be supported, for example in the 47 GHZ-49 GHz range.

More generally, a mobile device as disclosed herein may include a first dual-polarized antenna array associated with a first substrate and a second dual-polarized antenna array associated with a second substrate regardless of the shape of the corresponding antenna arrays and/or module(s). With the blocking threshold satisfied as sensed by a blockage sensor (e.g., an FMCW radar, a capacitive sensor, a touch sensor, or a machine-learning-based approach for detection of nearby obstructions), whether the mobile device switches from the default mode to the dynamic mode depends upon whether the signal performance threshold is satisfied. In turn, whether the signal performance threshold is satisfied depends upon the scanning angle associated with a set of beam weights used for receiving a polarized RF signal. In particular, the mobile device is assumed herein to be configured to steer or scan the beam(s) from both dual-polarized arrays. This beam steering may be an analog beam steering, a digital beam steering, or a hybrid beam steering. For example, suppose that each array has a plurality of N dual-polarized antennas and that analog beam steering is used, N being a plural positive integer. Assuming that all the antennas are active and combined for a single beam for each polarization, there would then be N co-polarized signals and N cross-polarized signals from each dual-polarized array. As will be explained further herein, the N co-polarized signals may then be phased by N corresponding phase shifters so that the desired beam steering is achieved (one phase shifter for each analog signal). Similarly, the N cross-polarized signals may also be phased by N corresponding phase shifters. During a default mode, the N co-polarized signals from each array may be combined at the first combiner to form a first MIMO layer RF signal. Similarly, the N cross-polarized signals form each array may be combined at the second combiner to form a second MIMO layer RF signal.

For such an analog beam steering implementation, the mobile device would have at least two RF chains, one for processing the first MIMO layer RF signal and one for processing the second MIMO layer RF signal. Each RF chain includes the appropriate number of components such as amplifiers, filters, and down-converting mixers for translating its combined signal from the RF domain to baseband. In addition, each RF chain includes an analog-to-digital converter (ADC) for converting the down-converted analog signal into a digital signal that may then be processed by digital signal processing components to recover the data stream for the corresponding MIMO layer. The combiners in an analog beam steering implementation may be either in the RF domain, some intermediate frequency (IF) in a super-heterodyne implementation, or at the baseband. The following discussion will assume without loss of generality that the combiners are in the RF domain for an analog beam steering implementation.

In contrast, a digital beam steering implementation would need no analog phase shifters. But a purely digital beam steering implementation would have an RF chain for each of the 2N co-polarized signals and for each of the 2N cross-polarized signals. A digital beam steering implementation would thus require 4N ADCs for the 4N RF chains. The combining would then be purely digital within the digital signal processing components of the mobile device. Such a relatively-large number of RF chains may be problematic in some implementations. For example, a relatively-simple hybrid beam steering implementation may use two RF chains for each MIMO layer. During the default mode of operation, the appropriate polarized signals from a set of antennas in each array are combined in a first one of the RF chains for the MIMO layer whereas another set of antennas in each array drive a second one of the RF chains for the MIMO layer. A hybrid beam steering implementation may thus use different beam steering angles for two beams from each dual-polarized antenna array.

The following discussion will be directed to an analog beam steering implementation for case of discussion and without loss of generality. There are thus two RF chains, one for the first MIMO layer and another for the second MIMO layer. Each RF chain includes a combiner for combining the appropriate polarized signals from the two arrays. Regardless of whether there is blockage, the polarization selection at the combiners from one of the arrays does not change. Since it is arbitrary as to which array is designated as the first array and which array is designated as the second array, it will be assumed herein that this fixed selection is with respect to the first array during both the default mode and the dynamic mode of operation without loss of generality. With the polarization selection being static for the first array, the following discussion will assume that the blockage sensor is sensing blockage for the second array. However, it will be appreciated that the blockage of the first array may also be used herein with regard to determining a polarization selection from the second array.

Figure 4:
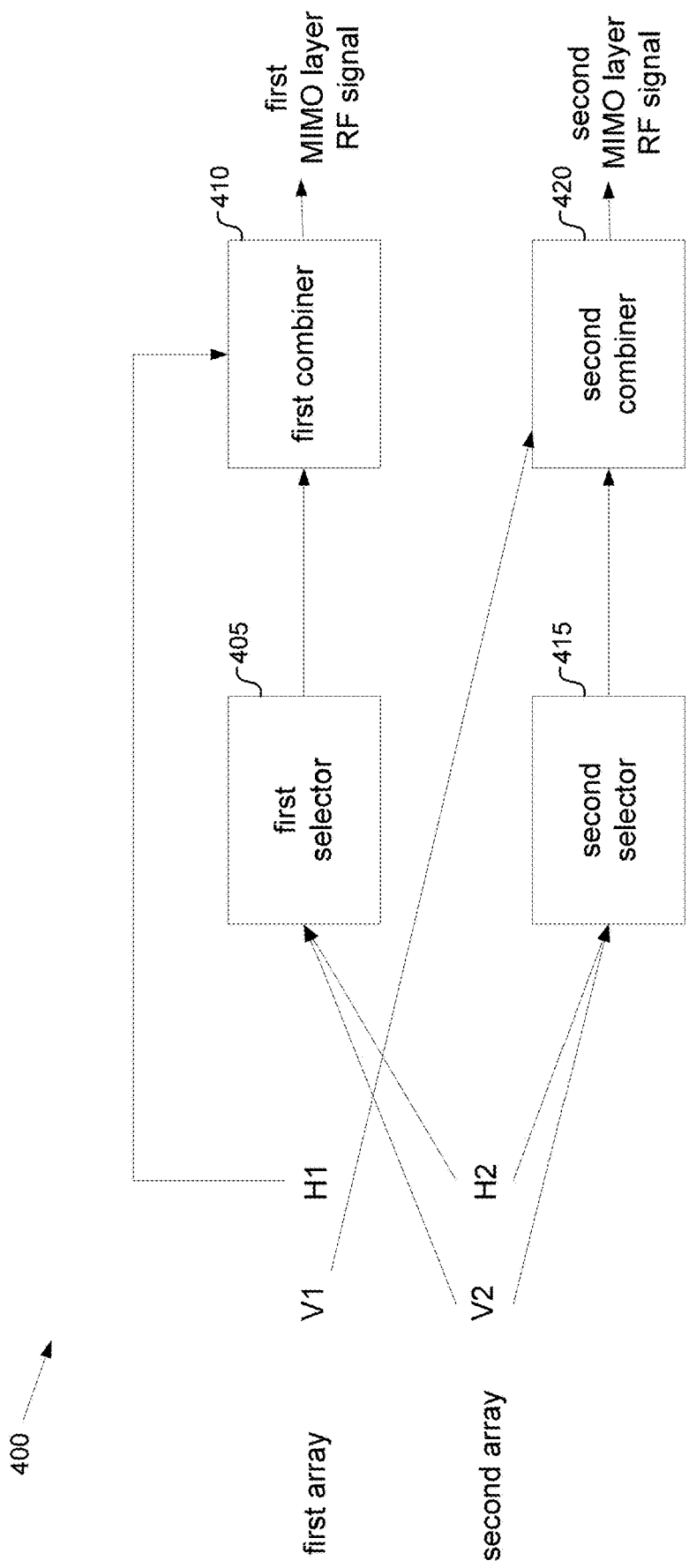
FIG. 4 illustrates a receive polarization selection portion of a dual-polarized MIMO mobile device in accordance with an aspect of the disclosure.

The polarization selection portion of a mobile device 400 having a first selector 405 for a first combiner 410 and having a second selector 415 for a second combiner 420 is shown in FIG. 4. In this implementation, the co-polarized signals are horizontally (H) polarized whereas the cross-polarized signals are vertically (V) polarized. After phase shifting, the H signals from the first array are combined and denoted as a signal H1. Similarly, the V signals from the first array are phase-shifted and combined to form a signal denoted as V1. The phase-shifted and combined signals from the second array are thus denoted as H2 and V2, depending upon their polarization. A first combiner 410 for forming a first MIMO layer RF signal always receives the H1 signal from the first array, regardless of whether the default or dynamic mode is active. Similarly, a second combiner 420 for forming a second MIMO layer RF signal always receives the V1 signal from the first array. But a first selector 405 selects between the H2 and V2 signals from the second array to provide a first selected signal to the first combiner 410. In one implementation, the first selector 405 selects for the H2 signal during the default mode but instead selects for the V2 signal during the dynamic mode. First selector 405 thus may also be denoted as a first multiplexer since it multiplexes between the H2 and V2 signals to form the first selected signal. Similarly, a second selector 415 selects between the H2 and V2 signals to provide a second selected signal to the second combiner 420. During the default mode, the second selector 415 selects for the V2 signal whereas it selects for the H2 signal during the dynamic mode of operation. Second selector 415 thus may also be denoted as a second multiplexer since it multiplexes between the H2 and V2 signals to form the second selected signal.

In the single threshold implementation, the mobile device 400 controls the first selector 405 and the second selector 415 to maintain their default selection so long as the blockage is below the blockage threshold. Should the blockage exceed the blockage threshold, the mobile device controls the first selector 405 and the second selector 415 to switch to their dynamic selection. In the dual threshold implementation, the mobile device does not command the selectors 405 and 415 to switch their selection from the default selection to the dynamic selection unless both the blockage and the signal performance thresholds are satisfied. Whereas the level of blockage in the mobile device 400 depends upon the position of the user's hand and fingers, the signal performance may depend upon the scanning angle of the beam. As the beam is steered, the signal performance for a given MIMO layer may vary accordingly. Thus, at a first scanning angle, the signal performance may be such that the mobile device 400 maintains the default configuration despite the blockage satisfying the blockage threshold. But at a second scanning angle, the signal performance may drop such that the mobile device 400 switches the selectors 405 and 415 so that the dynamic configuration is active while the blockage satisfies the blockage threshold.

Note that there is a switching loss for the mobile device 400 to switch the selectors 405 and 415 from the default mode to the dynamic mode selection. In a static dual threshold implementation, the mobile device 400 may be configured with a mapping such as a lookup table to determine whether, based upon the beam steering, the signal performance is such that the mobile device 400 should switch from the default to the dynamic mode. As will be explained further herein, the mapping may be based upon an a priori offline measurement of the signal performance for the default and dynamic modes at various steering angles for the beam from the antenna arrays with and without blockage. For example, the mobile device 400 may switch from the default configuration to the dynamic configuration responsive to a combination of the blockage being greater than the blockage threshold and a beam scan angle being within a polarization switch angle range.

In a dynamic dual threshold implementation, the mobile device 400 may periodically (or aperiodically) switch the selection at the selectors 405 and 415 during operation of the mobile device 400 in the presence of blockage exceeding the blockage threshold to measure the signal performance that results from a dynamic configuration selection. The resulting signal performance measurement may thus be denoted as a dynamic selection signal performance. Similarly, a signal performance measurement performed with the selectors 405 and 415 using a default configuration selection may be denoted as a default mode signal performance. In the dynamic dual threshold implementation, the mobile device 400 could thus compare the default and dynamic signal performance while the blockage satisfies the blockage threshold. Should the dynamic signal performance be greater than the default signal performance by the signal performance threshold, the mobile device 400 would switch from the default configuration to the dynamic configuration. Since it increases complexity and consumes power each time the selection at the selectors 405 and 415 is switched, the measurement of the dynamic signal performance may be performed just once for a given beam steering angle in some implementations (as long as the blockage is within a certain range or over the blockage threshold). Should the beam steering angle and the blockage remain the same or within some tolerance, the mobile device 400 may maintain whatever mode selection was decided upon based upon the initial signal performance determinations. But should the steering angle change sufficiently, the mobile device 400 may again perform the static and dynamic signal performance measurements.

Figure 5:
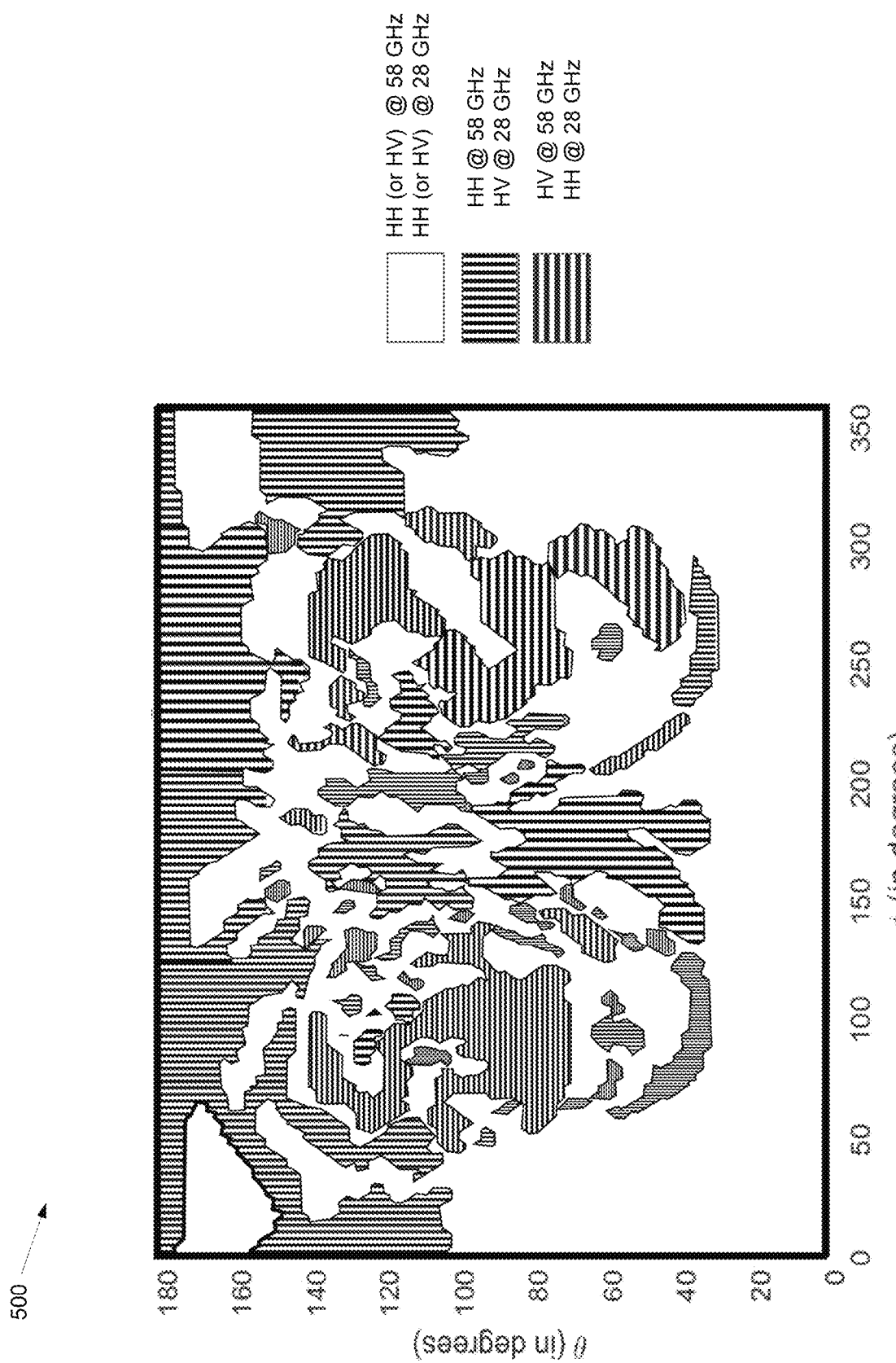
FIG. 5 is a plot of the polarization selections satisfying a signal performance threshold as a function of a beam scan angle in the absence of blockage.

As compared to the static dual threshold implementation, a dynamic dual threshold implementation introduces some latency, complexity, and switching loss in determining whether to switch or not from the default mode to the dynamic mode. This latency is eliminated in the static dual threshold implementation as there is no need to switch the selectors to measure the signal performance, instead the switching decision would be based upon a priori measurements. For example, consider a plot 500 shown in FIG. 5 for a no blockage scenario (the blockage not exceeding the blockage threshold) for both an elevation scan angle (θ) as well as an azimuth scan angle (q). Based upon these scan angles with no blockage, plot 500 indicates what polarization selection for a MIMO layer results in the best signal performance. In this example, it will be assumed again that the polarization selection from the first array does not change. Instead, it is the selection of the horizontally polarized (H) signal or the vertically polarized (V) signal from the second array that depends upon the scan angle and frequency. A polarization selection of HH thus signifies that the horizontally polarized signal is selected from the first array and also from the second array. Conversely, a polarization selection of HV signifies that the horizontally polarized signal is selected from the first array whereas the vertically polarized signal is selected from the second array.

Clear (no cross-hatching) areas in plot 500 correspond to a default polarization selection for the MIMO layer. This default polarization selection may be HH in one implementation and may instead be HV in another implementation. This default polarization selection occurs for operation at 58 GHZ and also at 28 GHZ. At certain scan angles and depending upon the frequency, an improved signal performance is achieved by switching the default polarization selection from the second array in the dynamic mode of operation. For example, regions in plot 500 with a vertical cross-hatching correspond to a polarization switch at one of the two frequencies (in this example, 28 GHZ and 58 GHZ). This switch depends upon whether the default configuration is HH or HV for operation at both 28 GHZ and at 58 GHZ. For operation at 28 GHz with the default configuration being HH, improved signal performance for the vertically cross-hatched regions in plot 500 may be achieved by switching to an HV selection although the default configuration of HH is maintained for operation at 58 GHz. Conversely, should the default configuration be HV for operation at both 28 GHZ and at 58 GHZ, improved signal performance the vertically cross-hatched regions in plot 500 may be achieved by switching to HH for operation at 58 GHZ although the default configuration of HV is maintained for operation at 28 GHZ.

Regions in plot 500 with a horizontal cross-hatching also correspond to a polarization switch at one of the two frequencies (in this example, 28 GHZ and 58 GHz). This switch again depends upon whether the default configuration is HH or HV for operation at both 28 GHZ and at 58 GHZ. If the default configuration at both frequencies is HH, improved signal performance for the horizontally cross-hatched regions in plot 500 may be achieved for operation at 58 GHZ by switching to an HV selection. Conversely, this default HH configuration is maintained in the horizontally cross-hatched regions for the dynamic configuration at 28 GHZ. Similarly, if the default configuration is HV for operation at both 28 GHz and 58 GHZ, this default configuration is maintained for the dynamic configuration at 58 GHz but switched to HH for operation at 28 GHZ.

Figure 6:
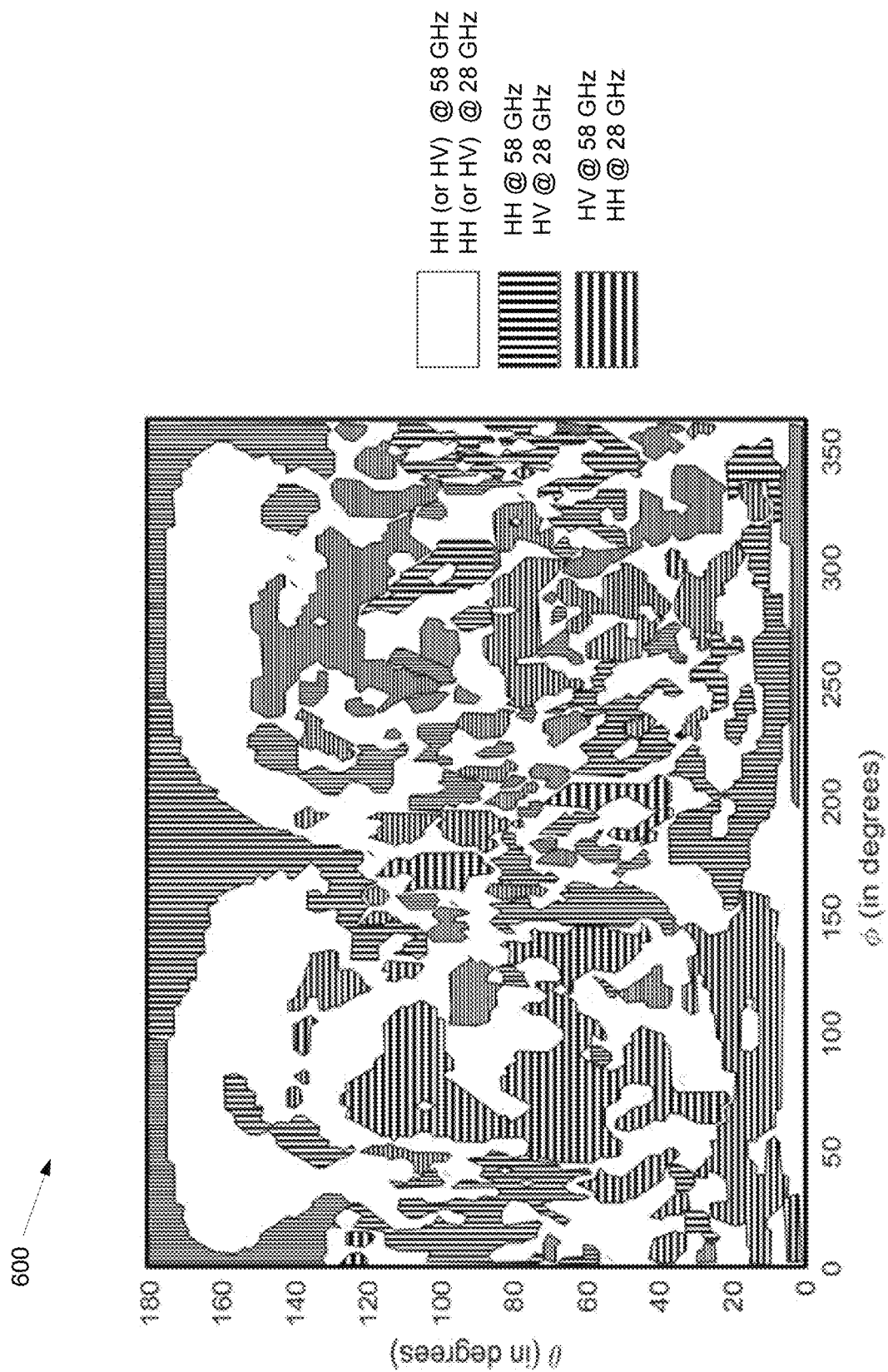
FIG. 6 is a plot of the polarization selections satisfying a signal performance threshold as a function of a beam scan angle in the presence of blockage greater than a blockage threshold.

An examination of plot 500 shows that default polarization selection is suitable with no blockage across the entire span of azimuth scan angles at relatively small (30° or less) elevation angles. Since the beam steering will typically dwell within such a span of scan angles, it may thus be appreciated that operation in the default mode will generally provide a suitable signal performance without any significant blockage (e.g., in a no or low blockage scenario). However, this default mode does not necessarily result in sufficient signal performance for operation in a high-blockage scenario (blockage above the blockage threshold). For example, consider a plot 600 shown in FIG. 6 for a high blockage situation (the blockage exceeding the blockage threshold) for both an elevation scan angle (θ) as well as an azimuth scan angle (φ). Based upon these scan angles in the presence of blockage, plot 600 indicates what polarization selection for a MIMO layer results in the best signal performance. In this example, it will be assumed again that the polarization selection from the first array does not change. Instead, it is the selection of the horizontally polarized (H) signal or the vertically polarized (V) signal from the second array that depends upon the scan angle and frequency. Clear (no cross-hatching) areas in plot 600 correspond to a default polarization selection for the MIMO layer. As discussed for plot 500, the default polarization selection for plot 600 may be HH in one implementation and may instead be HV in another implementation. This default polarization selection occurs for operation at 58 GHz and also at 28 GHz. At certain scan angles and depending upon the frequency, an improved signal performance is achieved by switching the default polarization selection from the second array. These regions in plot 600 are designated by analogous vertical and horizontal cross-hatching as discussed for plot 500 and have the same frequency-dependent polarization selections.

Note the difference between plots 500 and 600 for elevation scan angles less than approximately 30°. Whereas across all azimuth scan angles in plot 500 the best signal performance is achieved at these smaller elevation scan angles through a default polarization selection, that is not true for plot 600. Instead, as the azimuth scan angles vary across these smaller elevation scan angles, the best signal performance may instead be achieved through a dynamic polarization selection. For example, for the horizontally cross-hatched region at approximately 10° in elevation ranging from an azimuth scan angle of approximately 60° to approximately 150°, the best signal performance is achieved through an HV polarization selection instead of the default HH polarization selection for operation at 58 GHz (the default HH configuration being maintained for operation at 28 GHZ). Similarly, for the vertically cross-hatched region at approximately 10° in elevation and an azimuth scan angle of 250°, the best signal performance is achieved for an HV polarization selection instead of the default HH polarization selection for operation at 28 GHZ (the default HH polarization selection being maintained for operation at 58 GHZ). It may thus be seen that a decision to switch from the default mode to the dynamic mode depends upon the blockage and the beam scan angle. As blockage increases, the advantages of implementing the dynamic mode of polarization increase accordingly. The decision to switch from the default mode to the dynamic mode may also depend upon the signal quality threshold as discussed for the dual-threshold implementation. An example transceiver for blockage-based polarization selection will now be discussed in more detail.

Figure 7B:
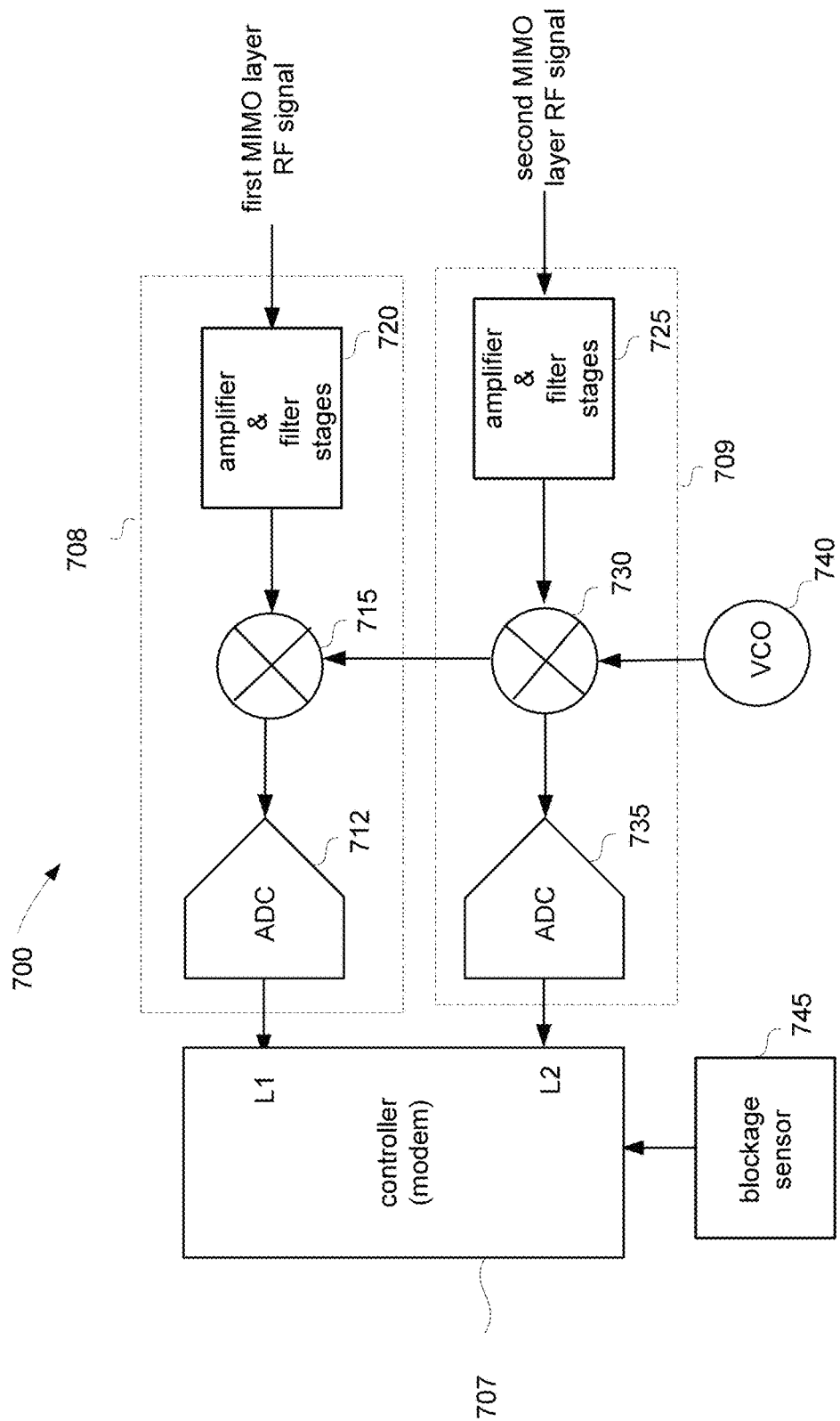
FIG. 7B illustrates receive RF chains, modem processor, and blockage sensor of a dual-polarized MIMO mobile device in accordance with an aspect of the disclosure.
Figure 7C:
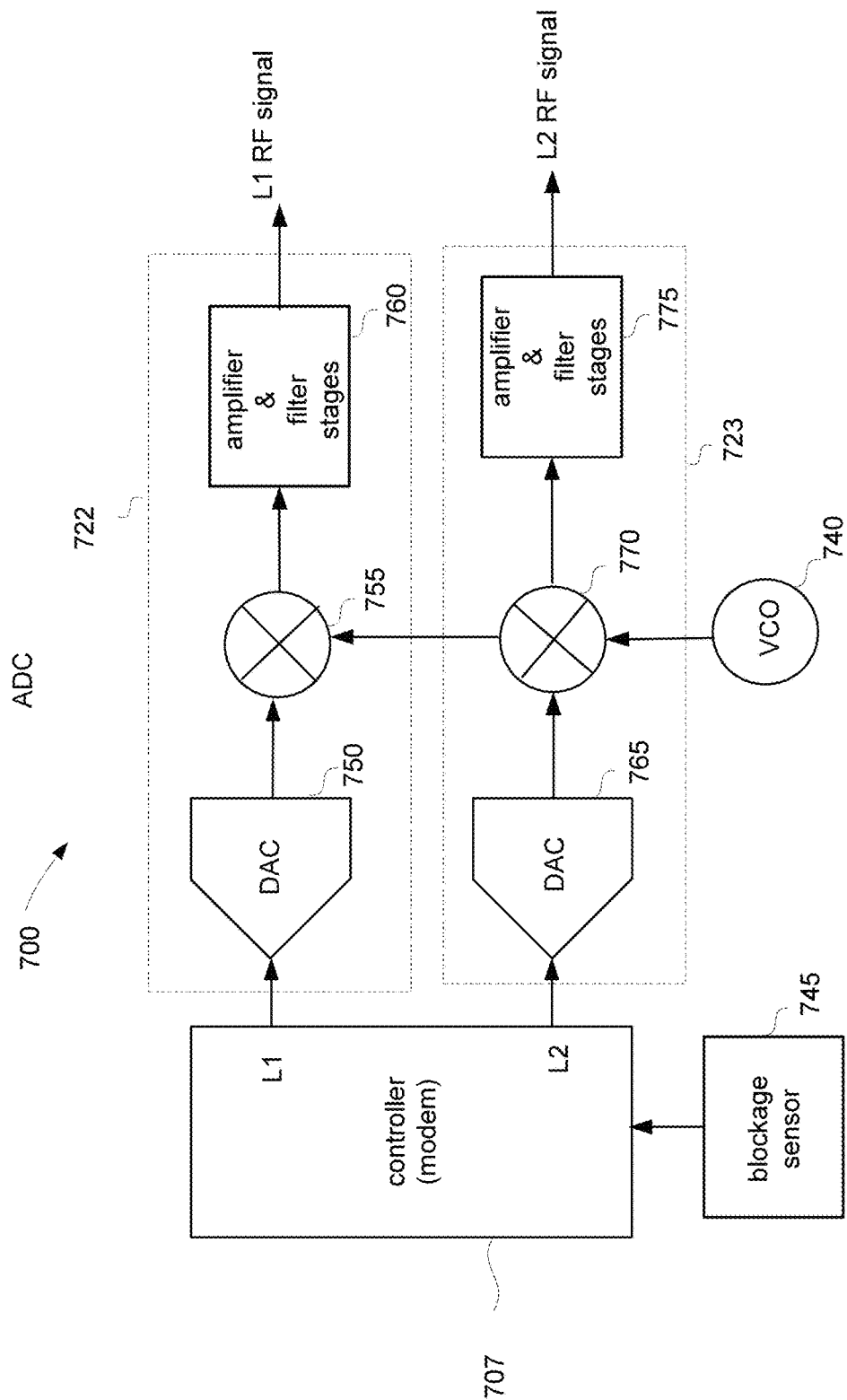
FIG. 7C illustrates transmit RF chains, modem processor, and blockage sensor of a dual-polarized MIMO mobile device in accordance with an aspect of the disclosure.

An example transceiver 700 configured for controlling the blockage-based polarization selection discussed herein is shown in FIGS. 7A, 7B, 7C, 7D, and 7E. For illustration clarity, only the receive RF paths or chains are shown for transceiver 700 for the two MIMO layers (L1 and L2) in FIGS. 7A and 7B. Conversely, only the transmit RF chains for the two MIMO layers are shown in FIGS. 7C. 7E, and 7D. Transceiver 700 is configured for analog beam forming. For illustration clarity, just two antennas 701 and 702 are shown in a first array 705 in FIG. 7A. Similarly, a second array 710 also shows just two antennas 703 and 704. For additional illustration clarity, each antenna is configured for a single polarization (in this case, either for horizontal (H) or for vertical (V) polarization). In the first array 705, antenna 701 receives an H1 signal whereas antenna 702 receives a V1 signal. However, it will be appreciated that more than one antenna for each polarization is necessary in a given antenna array for beam steering to be implemented. Second array 710 is analogous to first array 705 in that its antenna 703 receives an H2 signal whereas its antenna 704 receives a V2 signal.

The received signal from each antenna is amplified by a corresponding low-noise amplifier 706 and phase shifted by a corresponding phase shifter 711. There is thus an amplified and phase-shifted H1 signal and V1 signal from the first array 705 and an amplified and phase-shifted H2 signal and V2 signal from the second array 710. Referring again to FIG. 4, the amplified and phase-shifted H1 signal from the first array 705 is received by the first combiner 410 and the amplified and phase-shifted V1 signal is received by the second combiner 420 regardless of whether the default configuration or the dynamic configuration is active. But the amplified and phase-shifted H2 and V2 signals are selected by the first selector 405 and the second selector 415 as discussed with regard to FIG. 4. Each selector then produces a corresponding MIMO layer RF signal.

As shown in FIG. 7B, signals from the first combiner are processed through additional amplification and filtering stages 720 and then down converted to baseband in a mixer 715 responsive to a local oscillator signal from an oscillator such as a voltage-controlled oscillator (VCO) 740. An analog-to-digital converter (ADC) 712 then converts the analog baseband signal into a layer 1 (L1) digital data stream received by a modem 707. Stages 720, mixer 715, and ADC 710 thus form a first RF receive chain 708 for the L1 signals. Similarly, transceiver 700 includes a second RF receive chain 709 for providing the layer 2 (L2) data stream to the modem 707. The second RF chain 709 includes corresponding stages 725, a mixer 730, and an ADC 735.

Modem 707 may also be denoted as a baseband modem processor or controller as it controls whether the default configuration or the dynamic configuration is used with respect to the polarization selection from the second array 705 for the two layers. In particular, modem 707 responds to a blockage level signal from a blockage sensor 745 and compares the blockage level signal to the blockage threshold. In a single threshold implementation, modem 707 may then control the selection at the first and second selectors 405 and 415 according to whether the blockage threshold is satisfied or not as described herein. In a dual threshold implementation, modem 707 would also determine whether the signal performance threshold is satisfied with respect to switching from the default to the dynamic configuration once the blockage threshold is satisfied. In one implementation, modem 707 may be configured with the blockage and signal performance thresholds such as at manufacture. Alternatively, the blockage and signal performance thresholds may be negotiated with a network node such as a generalized NodeB (gNB).

The transmit RF chains for transceiver 700 are shown in FIG. 7C. For the first layer, the modem 707 provides the L1 digital baseband signal to a digital-to-analog converter (DAC) 750. DAC 750 converts the L1 digital baseband signal into an L1 analog baseband signal that is upconverted in a mixer 755 to RF. After the RF signal passes through amplification and filter stages 760, a first MIMO layer RF transmit signal is ready for the default or dynamic configurations for the polarization selection as will be explained further with respect to FIG. 7D. DAC 750, mixer 755, and amplifier and filter stages 760 form a first RF transmit chain 722.

Modem 705 also provides the L2 digital baseband signal to a DAC 765. DAC 765 converts the L2 digital baseband signal into an L2 analog baseband signal that is upconverted in a mixer 770 to RF. After the RF signal passes through amplification and filter stages 775, a second MIMO layer RF transmit signal is ready for the default or dynamic configurations for the polarization selection as will be explained further with respect to FIG. 7D. DAC 765, mixer 770, and amplifier and filter stages 775 form a second RF transmit chain 723.

Figure 7D:
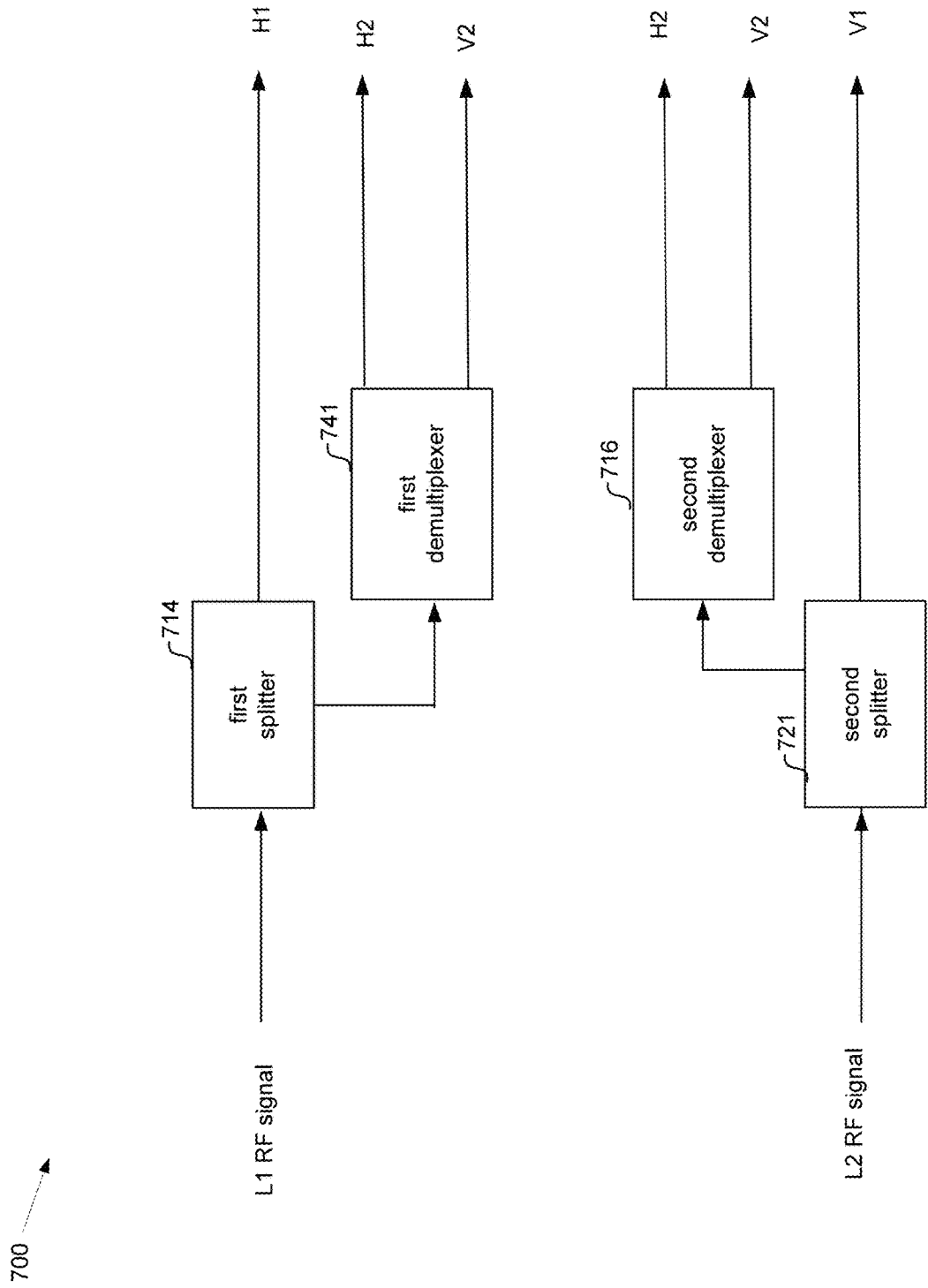
FIG. 7D illustrates a transmit polarization selection portion of a dual-polarized MIMO mobile device in accordance with an aspect of the disclosure.

As shown in FIG. 7D, the L1 RF transmit signal is split through a first splitter 714 to form the H1 signal and also a first split signal provided to a first switch or demultiplexer 741. Depending upon whether the default configuration or the dynamic configuration is active, first demultiplexer 741 either routes the first split signal from the first splitter 714 to form the H2 signal or the V2 signal. Similarly, the L2 RF transmit signal is split through a second splitter 721 to produce the V1 signal and also a second split signal provided to a second switch or demultiplexer 716. Depending upon whether the default configuration or the dynamic configuration is active, second demultiplexer 716 either routes the second split signal from the second splitter 721 to form the H2 signal or the V2 signal.

Figure 7E:
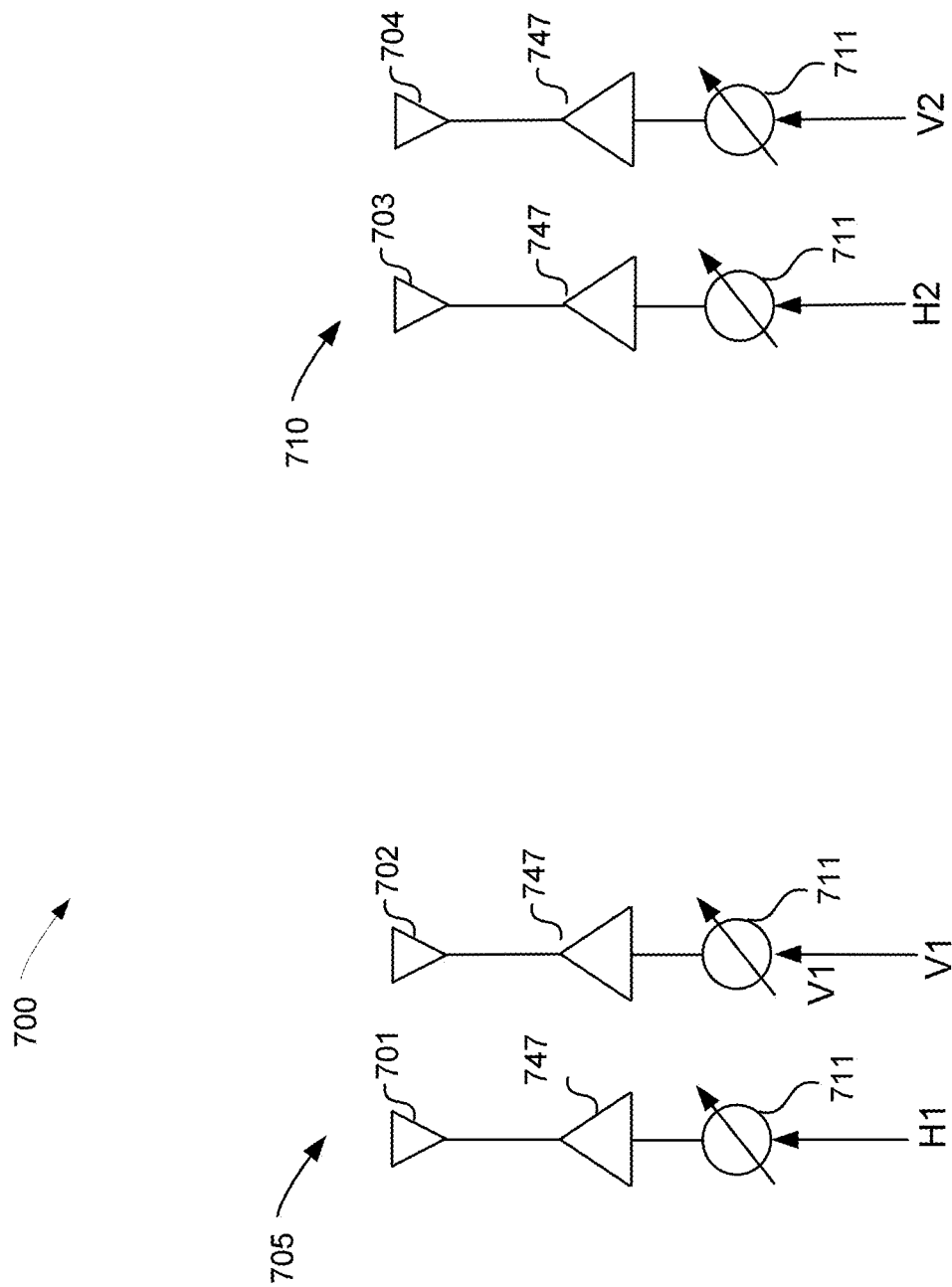
FIG. 7E illustrates transmit first and second antenna arrays of a dual-polarized MIMO mobile device and associated power amplifiers and phase-shifters in accordance with an aspect of the disclosure.

The coupling of the H1, V1, H2, and V2 signals for transmission through the first array 705 and the second array 710 is shown in FIG. 7E. As discussed with respect to FIG. 7A, the first array shows just the two antennas 701 and 702. Similarly, the second array 710 also shows just two antennas 703 and 704. In an actual implementation, more than one antenna for each polarization would enable beam steering. For additional illustration clarity, each antenna is configured for a single polarization (in this case, either for horizontal (H) or for vertical (V) polarization. Each signal couples through a corresponding power amplifier 747 and a phase shifter 711 to the corresponding antenna. In this fashion, the antenna 701 transmits the H1 signal, the antenna 702 transmits the V1 signal, the antenna 703 transmits the H2 signal, and the antenna 704 transmits the V2 signal. While RF-path phase shifting is described above, LO-path phase shifting may additionally or alternatively be implemented. Alternatively, the phase shifting may be performed by coding in the digital domain at baseband.

Regardless of whether the default configuration or the dynamic configuration is active, the H1 signal is formed from the L1 RF transmit signal. Similarly, the V1 signal is formed from the L2 RF transmit signal. If the default configuration for the transmission of the first layer is H1 and H2, then the H2 signal is formed from the L1 RF transmit signal during the default configuration. In the dynamic configuration, the first layer would then be transmitted using H1 and V2. Similarly, the V1 signal is formed from the L2 RF transmit signal regardless of whether the default or the dynamic configuration is active. If the default configuration for the second layer is V1 and V2, then the V2 signal is formed from the L2 RF transmit signal during the default configuration. In the dynamic configuration, the second layer would be transmitted using V1 and H2. Should the default configuration for transmission of the first layer be H1 and V2, then the dynamic configuration would be H1 and H2. Similarly, if the default configuration for transmission of the second layer is V1 and H2, then the dynamic configuration would be V1 and V2.

The network for a mobile device that transitions between the default and dynamic configurations need not be informed of the transitions although this notification may be performed in some implementations. However, should the mobile device transition its polarization selection during transmission, the network should be informed so that a base station/gNB receiving the transmissions may change its polarization selections accordingly. The mobile device may thus transmit a control signal to the gNB to alert the gNB that it is transitioning from the default to the dynamic configuration (and that it is transitioning from the dynamic configuration back to the default configuration).

Figure 8:
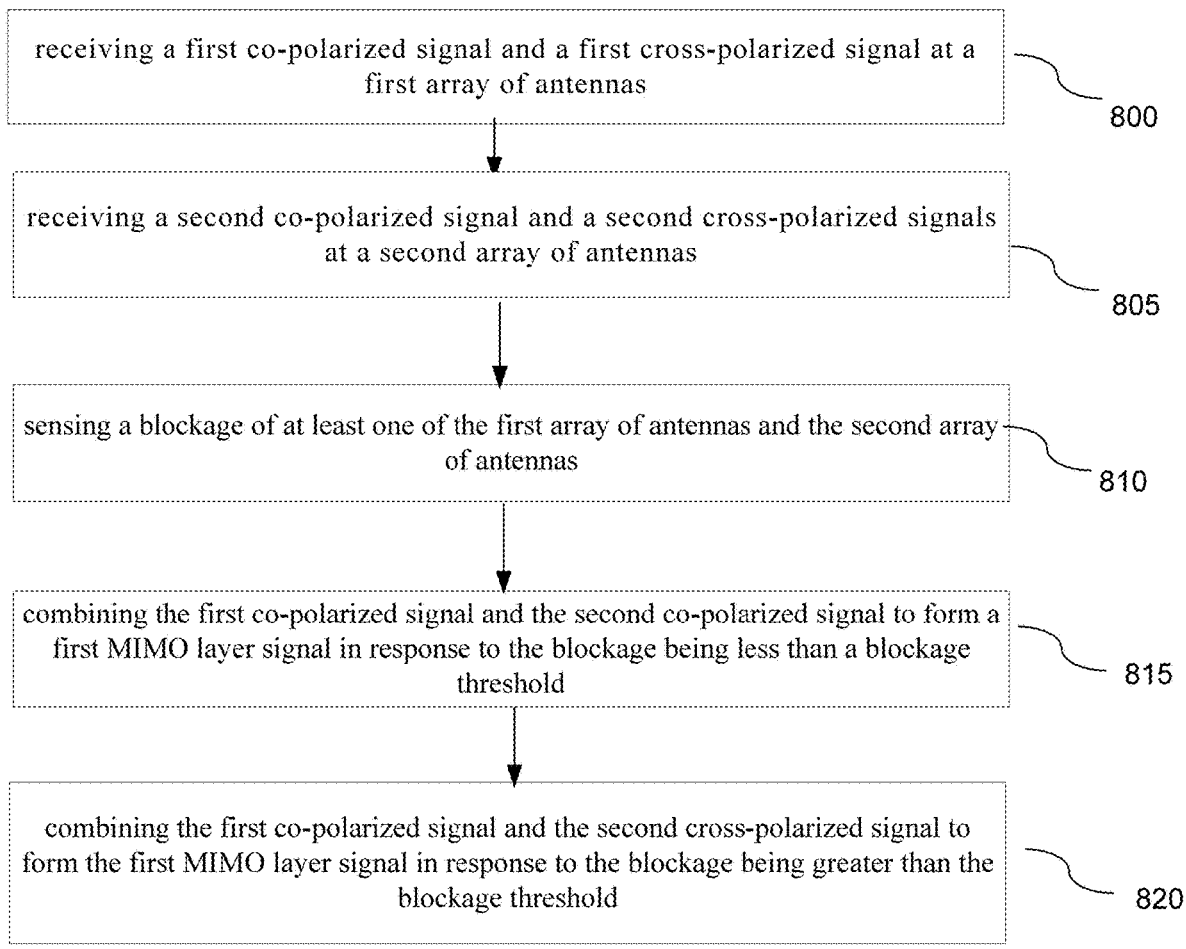
FIG. 8 is a flowchart of a dual-polarized MIMO method in accordance with an aspect of the disclosure.

A dual-polarized MIMO dynamic polarization selection method will now be discussed with regard to the flowchart of FIG. 8. The method includes an act 800 of receiving a first co-polarized signal and a first cross-polarized signal at a first array of antennas. The receipt of the co-polarized and cross-polarized signals at the first array of FIGS. 2, 3, 4, and 7A is an example of act 800. The method also includes an act 805 of receiving a second co-polarized signal and a second cross-polarized signals at a second array of antennas. The receipt of the co-polarized and cross-polarized signal at the second array of FIGS. 2, 3, 4, and 7A is an example of act 805. In addition, the method includes an act 810 of sensing a blockage of at least one of the first array of antennas and of the second array of antennas. The sensing by the blockage sensor 745 of FIG. 7B is an example of act 810. The method also includes an act 815 of combining the first co-polarized signal and the second co-polarized signal to form a first MIMO layer signal in response to the blockage being less than a blockage threshold. The formation of the first MIMO layer RF signal at the first combiner 410 of FIG. 4 during the default configuration is an example of act 815. Finally, the method includes an act 820 of combining the first co-polarized signal and the second cross-polarized signal to form the first MIMO layer signal in response to the blockage being greater than the blockage threshold. The formation of the first MIMO layer RF signal at the first combiner 410 of FIG. 4 during the dynamic configuration is an example of act 820.

The disclosure will now be summarized in the following example clauses.

Clause 1. A dual-polarized multiple-input-multiple-output (MIMO) mobile device, comprising:
- a first array of antennas configured to receive a first co-polarized received signal and a first cross-polarized received signal;
- a second array of antennas configured to receive a second co-polarized received signal and a second cross-polarized received signal;
- a first selector configured to select between the second co-polarized received signal and the second cross-polarized received signal to form a first selected signal;
- a first combiner configured to combine the first co-polarized received signal with the first selected signal to form a first MIMO layer received signal;
- a blockage sensor configured to detect a blockage of at least one of the first array of antennas and the second array of antennas; and
- a controller configured to control the first selector to select for the second co-polarized received signal responsive to the blockage being less than a blockage threshold.

Clause 2. The dual-polarized multiple-input-multiple-output (MIMO) mobile device of clause 1, wherein the controller is further configured to control the first selector to select for the second cross-polarized received signal responsive to the blockage being greater than the blockage threshold.

Clause 3. The dual-polarized multiple-input-multiple-output (MIMO) mobile device of clause 1, further comprising:
- a second selector configured to select between the second co-polarized received signal and the second cross-polarized received signal to form a second selected signal; and
- a second combiner configured to combine the first cross-polarized received signal with the second selected signal to form a second MIMO layer signal, wherein the controller is further configured to control the second selector to select for the second cross-polarized received signal responsive to the blockage being less than the blockage threshold.

Clause 4. The dual-polarized multiple-input-multiple-output (MIMO) mobile device of clause 1, wherein the controller is further configured to control the first selector to select for the second cross-polarized received signal responsive to a combination of the blockage being greater than the blockage threshold and a performance measurement of the first MIMO layer received signal being less than a performance threshold.

Clause 5. The dual-polarized multiple-input-multiple-output (MIMO) mobile device of clause 4, wherein the performance measurement comprises a signal-to-noise ratio measurement and the performance threshold is a signal-to-noise ratio threshold.

Clause 6. The dual-polarized multiple-input-multiple-output (MIMO) mobile device of clause 4, wherein the performance measurement comprises a reference signal received power (RSRP) measurement and the performance threshold is a RSRP threshold.

Clause 7. The dual-polarized multiple-input-multiple-output (MIMO) mobile device of clause 4, wherein the performance measurement comprises a reference signal received quality (RSRQ) measurement and the performance threshold is a RSRQ threshold.

Clause 8. The dual-polarized multiple-input-multiple-output (MIMO) mobile device of clause 4, wherein the performance measurement comprises a signal-to-interference-and-noise ratio (SINR) measurement and the performance threshold is a SINR threshold.

Clause 9. The dual-polarized multiple-input-multiple-output (MIMO) mobile device of clause 1, wherein the controller is further configured to control the first selector to select for the second cross-polarized received signal responsive to a combination of the blockage being greater than the blockage threshold and a first performance measurement of the first MIMO layer received signal while the first selector selects for the second cross-polarized received signal being greater by a performance threshold than a second performance measurement of the first layer received signal while the first selector selects for the second co-polarized signal.

Clause 10. The dual-polarized multiple-input-multiple-output (MIMO) mobile device of clause 9, wherein the controller is further configured to set the blockage threshold and performance threshold responsive to a network command.

Clause 11. The dual-polarized multiple-input-multiple-output (MIMO) mobile device of any of clauses 1-10, wherein the controller comprises a modem processor.

Clause 12. The dual-polarized multiple-input-multiple-output (MIMO) mobile device of clause 1, wherein the controller is further configured to control the first selector to select for the second cross-polarized received signal responsive to a combination of the blockage being greater than the blockage threshold and a scanning angle of a beam for the first array of antennas being within a polarization switch angle range.

Clause 13. The dual-polarized multiple-input-multiple-output (MIMO) mobile device of any of clauses 1-12, wherein the first array of antennas is further configured to transmit a first co-polarized transmit signal and a first cross-polarized transmit signal and the second array of antennas is further configured to transmit a second co-polarized transmit signal and a second cross-polarized transmit signal, the mobile device further comprising:

a first splitter configured to split a first MIMO layer transmit signal into the first co-polarized transmit signal and a first split signal; and a first demultiplexer configured to demultiplex the first split signal, wherein the controller is further configured to control the first demultiplexer to demultiplex the first split signal to form the second co-polarized transmit signal responsive to the blockage being less than the blockage threshold.

Clause 14. The dual-polarized multiple-input-multiple-output (MIMO) mobile device of clause 13, further comprising:

a second splitter configured to split a second MIMO layer transmit signal into the first cross-polarized transmit signal and a second split signal; and a second demultiplexer configured to demultiplex the second split signal, wherein the controller is further configured to control the second demultiplexer to demultiplex the second split signal to form the first cross-polarized transmit signal responsive to the blockage being less than the blockage threshold.

Clause 15. The dual-polarized multiple-input-multiple-output (MIMO) mobile device of clause 13, wherein the controller is further configured to control the first demultiplexer to demultiplex the first split signal to form the second cross-polarized transmit signal responsive to the blockage being greater than the blockage threshold.

Clause 16. The dual-polarized multiple-input-multiple-output (MIMO) mobile device of clause 13, wherein the controller is further configured to control the mobile device to notify a network of whether the first split signal is used to form the second co-polarized transmit signal or to form the second cross-polarized transmit signal.

Clause 17. The dual-polarized multiple-input-multiple-output (MIMO) mobile device of any of clauses 1-16, further comprising:

a housing for the mobile device, wherein the housing includes a planar front surface, a planar back surface, and an edge that joins the planar front surface to the planar back surface, and wherein the first array of antennas is located adjacent the edge and the second array of antennas is located adjacent the planar back surface.

Clause 18. The dual-polarized multiple-input-multiple-output (MIMO) mobile device of clause 17, further comprising an L-shaped antenna module including the first array of antennas and the second array of antennas.

Clause 19. A dual-polarized multiple-input-multiple-output (MIMO) mobile device, comprising:

a first array of antennas configured to receive a first co-polarized received signal and a first cross-polarized received signal;

a second array of antennas configured to receive a second co-polarized received signal and a second cross-polarized received signal;

a first selector configured to select between the second co-polarized received signal and the second cross-polarized received signal to form a first selected signal;

a first combiner configured to combine the first co-polarized received signal with the first selected signal to form a first MIMO layer signal;

a blockage sensor configured to detect a blockage of at least one of the first array of antennas and the second array of antennas; and a controller configured to control the first selector to select for the second cross-polarized received signal responsive to the blockage being less than a blockage threshold.

Clause 20. The dual-polarized multiple-input-multiple-output (MIMO) mobile device of clause 19, wherein the controller is further configured to control the first selector to select for the second co-polarized received signal responsive to the blockage being greater than the blockage threshold.

Clause 21. The dual-polarized multiple-input-multiple-output (MIMO) mobile device of clause 19, wherein the controller is further configured to control the first selector to select for the second co-polarized received signal responsive to a combination of the blockage being greater than the blockage threshold and a performance measurement of the first MIMO layer signal being less than a performance threshold.

Clause 22. The dual-polarized multiple-input-multiple-output (MIMO) mobile device of any of clauses 19-21, wherein the blockage sensor comprises a frequency-modulated continuous-wave radar sensor.

Clause 23. dual-polarized multiple-input-multiple-output (MIMO) mobile device of clause 22, wherein the blockage sensor comprises a capacitive sensor.

Clause 24. A dual-polarized multiple-input-multiple-output (MIMO) method, comprising:

receiving a first co-polarized signal and a first cross-polarized signal at a first array of antennas;

receiving a second co-polarized signal and a second cross-polarized signal at a second array of antennas;

sensing a blockage of at least one of the first array of antennas and of the second array of antennas;

combining the first co-polarized signal and the second co-polarized signal to form a first MIMO layer signal in response to the blockage being less than a blockage threshold; and combining the first co-polarized signal and the second cross-polarized signal to form the first MIMO layer signal in response to the blockage being greater than the blockage threshold.

Clause 25. The dual-polarized multiple-input-multiple-output (MIMO) method of clause 24, further comprising:

combining the first cross-polarized signal and the second cross-polarized signal to form a second MIMO layer signal in response to the blockage being less than the blockage threshold; and combining the first cross-polarized signal and the second co-polarized signal to form the second MIMO layer signal in response to the blockage being greater than the blockage threshold.

Clause 26. The dual-polarized multiple-input-multiple-output (MIMO) method of any of clauses 24-25, wherein combining the first co-polarized signal with the second cross-polarized signal to form the first MIMO layer signal is further in response to a signal quality measurement of the first MIMO layer signal being less than a performance threshold.

Clause 27. A dual-polarized multiple-input-multiple-output (MIMO) method, comprising:

receiving a first co-polarized signal and a first cross-polarized signal at a first array of antennas;

receiving a second co-polarized signal and a second cross-polarized signal at a second array of antennas;

combining the first co-polarized signal and the second cross-polarized signal to form a first MIMO layer signal in a first mode;

combining the first co-polarized signal and the second co-polarized signal to form the first MIMO layer signal in a second mode; and switching between the first mode and the second mode based on a blockage scenario for the first array of antennas or for the second array of antennas.

Clause 28. The dual-polarized multiple-input-multiple-output (MIMO) method of clause 27, further comprising:
combining the first cross-polarized signal and the second co-polarized signal to form a second MIMO layer signal in the first mode; and
combining the first cross-polarized signal and the second cross-polarized signal to form the second MIMO layer signal in the second mode.

Clause 29. The dual-polarized multiple-input-multiple-output (MIMO) method of any of clauses 27-28, wherein the switching is further based on a signal quality measurement of the first MIMO layer signal being less than a performance threshold.

Clause 30. The dual-polarized multiple-input-multiple-output (MIMO) method of any of clauses 27-29,
wherein the switching is further based on a beam scan angle of the first array of antennas.

In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A dual-polarized multiple-input-multiple-output (MIMO) mobile device, comprising:
a first array of antennas configured to receive a first co-polarized received signal and a first cross-polarized received signal;
a second array of antennas configured to receive a second co-polarized received signal and a second cross-polarized received signal;
a first selector configured to select between the second co-polarized received signal and the second cross-polarized received signal to provide a first selected signal;
a first combiner configured to combine the first co-polarized received signal with the first selected signal to form a first MIMO layer received signal;
a blockage sensor configured to detect a blockage of at least one of the first array of antennas and the second array of antennas; and
a controller configured to control the first selector to select for the second co-polarized received signal responsive to the blockage being less than a blockage threshold.

2. The dual-polarized multiple-input-multiple-output (MIMO) mobile device of claim 1, wherein the controller is further configured to control the first selector to select for the second cross-polarized received signal responsive to the blockage being greater than the blockage threshold.

3. The dual-polarized multiple-input-multiple-output (MIMO) mobile device of claim 1, further comprising:
a second selector configured to select between the second co-polarized received signal and the second cross-polarized received signal to provide a second selected signal; and
a second combiner configured to combine the first cross-polarized received signal with the second selected signal to form a second MIMO layer signal, wherein the controller is further configured to control the second selector to select for the second cross-polarized received signal responsive to the blockage being less than the blockage threshold.

4. The dual-polarized multiple-input-multiple-output (MIMO) mobile device of claim 1, wherein the controller is further configured to control the first selector to select for the second cross-polarized received signal responsive to a combination of the blockage being greater than the blockage threshold and a performance measurement of the first MIMO layer received signal being less than a performance threshold.

5. The dual-polarized multiple-input-multiple-output (MIMO) mobile device of claim 4, wherein the performance measurement comprises a signal-to-noise ratio measurement and the performance threshold is a signal-to-noise ratio threshold.

6. The dual-polarized multiple-input-multiple-output (MIMO) mobile device of claim 4, wherein the performance measurement comprises a reference signal received power (RSRP) measurement and the performance threshold is a RSRP threshold.

7. The dual-polarized multiple-input-multiple-output (MIMO) mobile device of claim 4, wherein the performance measurement comprises a reference signal received quality (RSRQ) measurement and the performance threshold is a RSRQ threshold.

8. The dual-polarized multiple-input-multiple-output (MIMO) mobile device of claim 4, wherein the performance measurement comprises a signal-to-interference-and-noise ratio (SINR) measurement and the performance threshold is a SINR threshold.

9. The dual-polarized multiple-input-multiple-output (MIMO) mobile device of claim 1, wherein the controller is further configured to control the first selector to select for the second cross-polarized received signal responsive to a combination of the blockage being greater than the blockage threshold and a first performance measurement of the first MIMO layer received signal while the first selector selects for the second cross-polarized received signal being greater by a performance threshold than a second performance measurement of the first MIMO layer received signal while the first selector selects for the second co-polarized received signal.

10. The dual-polarized multiple-input-multiple-output (MIMO) mobile device of claim 9, wherein the controller is further configured to set the blockage threshold and performance threshold responsive to a network command.

11. The dual-polarized multiple-input-multiple-output (MIMO) mobile device of claim 1, wherein the controller comprises a modem processor.

12. The dual-polarized multiple-input-multiple-output (MIMO) mobile device of claim 1, wherein the controller is further configured to control the first selector to select for the second cross-polarized received signal responsive to a combination of the blockage being greater than the blockage threshold and a scanning angle of a beam for the first array of antennas being within a polarization switch angle range.

13. The dual-polarized multiple-input-multiple-output (MIMO) mobile device of claim 1, wherein the first array of antennas is further configured to transmit a first co-polarized transmit signal and a first cross-polarized transmit signal and the second array of antennas is further configured to transmit a second co-polarized transmit signal and a second cross-polarized transmit signal, the mobile device further comprising:

a first splitter configured to split a first MIMO layer transmit signal into the first co-polarized transmit signal and a first split signal; and a first demultiplexer configured to demultiplex the first split signal, wherein the controller is further configured to control the first demultiplexer to demultiplex the first split signal to form the second co-polarized transmit signal responsive to the blockage being less than the blockage threshold.

14. The dual-polarized multiple-input-multiple-output (MIMO) mobile device of claim 13, further comprising:
a second splitter configured to split a second MIMO layer transmit signal into the first cross-polarized transmit signal and a second split signal; and
a second demultiplexer configured to demultiplex the second split signal, wherein the controller is further configured to control the second demultiplexer to demultiplex the second split signal to form the first cross-polarized transmit signal responsive to the blockage being less than the blockage threshold.

15. The dual-polarized multiple-input-multiple-output (MIMO) mobile device of claim 13, wherein the controller is further configured to control the first demultiplexer to demultiplex the first split signal to form the second cross-polarized transmit signal responsive to the blockage being greater than the blockage threshold.

16. The dual-polarized multiple-input-multiple-output (MIMO) mobile device of claim 13, wherein the controller is further configured to control the mobile device to notify a network of whether the first split signal is used to form the second co-polarized transmit signal or to form the second cross-polarized transmit signal.

17. The dual-polarized multiple-input-multiple-output (MIMO) mobile device of claim 1, further comprising:
a housing for the mobile device, wherein the housing includes a planar front surface, a planar back surface, and an edge that joins the planar front surface to the planar back surface, and wherein the first array of antennas is located adjacent the edge and the second array of antennas is located adjacent the planar back surface.

18. The dual-polarized multiple-input-multiple-output (MIMO) mobile device of claim 17, further comprising an L-shaped antenna module including the first array of antennas and the second array of antennas.

19. A dual-polarized multiple-input-multiple-output (MIMO) mobile device, comprising:
a first array of antennas configured to receive a first co-polarized received signal and a first cross-polarized received signal;
a second array of antennas configured to receive a second co-polarized received signal and a second cross-polarized received signal;
a first selector configured to select between the second co-polarized received signal and the second cross-polarized received signal to form a first selected signal;
a first combiner configured to combine the first co-polarized received signal with the first selected signal to form a first MIMO layer signal;
a blockage sensor configured to detect a blockage of at least one of the first array of antennas and the second array of antennas; and
a controller configured to control the first selector to select for the second cross-polarized received signal responsive to the blockage being less than a blockage threshold.

20. The dual-polarized multiple-input-multiple-output (MIMO) mobile device of claim 19, wherein the controller is further configured to control the first selector to select for the second co-polarized received signal responsive to the blockage being greater than the blockage threshold.

21. The dual-polarized multiple-input-multiple-output (MIMO) mobile device of claim 19, wherein the controller is further configured to control the first selector to select for the second co-polarized received signal responsive to a combination of the blockage being greater than the blockage threshold and a performance measurement of the first MIMO layer signal being less than a performance threshold.

22. The dual-polarized multiple-input-multiple-output (MIMO) mobile device of claim 19, wherein the blockage sensor comprises a frequency-modulated continuous-wave radar sensor.

23. The dual-polarized multiple-input-multiple-output (MIMO) mobile device of claim 19, wherein the blockage sensor comprises a capacitive sensor.

24. A dual-polarized multiple-input-multiple-output (MIMO) method, comprising:
receiving a first co-polarized signal and a first cross-polarized signal at a first array of antennas;
receiving a second co-polarized signal and a second cross-polarized signal at a second array of antennas;
sensing a blockage of at least one of the first array of antennas and of the second array of antennas;
combining the first co-polarized signal and the second co-polarized signal to form a first MIMO layer signal in response to the blockage being less than a blockage threshold; and
combining the first co-polarized signal and the second cross-polarized signal to form the first MIMO layer signal in response to the blockage being greater than the blockage threshold.

25. The dual-polarized multiple-input-multiple-output (MIMO) method of claim 24, further comprising:
combining the first cross-polarized signal and the second cross-polarized signal to form a second MIMO layer signal in response to the blockage being less than the blockage threshold; and
combining the first cross-polarized signal and the second co-polarized signal to form the second MIMO layer signal in response to the blockage being greater than the blockage threshold.

26. The dual-polarized multiple-input-multiple-output (MIMO) method of claim 24, wherein combining the first co-polarized signal with the second cross-polarized signal to form the first MIMO layer signal is further in response to a signal quality measurement of the first MIMO layer signal being less than a performance threshold.

27. A dual-polarized multiple-input-multiple-output (MIMO) method, comprising:
receiving a first co-polarized signal and a first cross-polarized signal at a first array of antennas;
receiving a second co-polarized signal and a second cross-polarized signal at a second array of antennas;
combining the first co-polarized signal and the second cross-polarized signal to form a first MIMO layer signal in a first mode;
combining the first co-polarized signal and the second co-polarized signal to form the first MIMO layer signal in second mode; and
switching between the first mode and the second mode based on a blockage scenario for the first array of antennas or for the second array of antennas.

28. The dual-polarized multiple-input-multiple-output (MIMO) method of claim 27, further comprising:
   combining the first cross-polarized signal and the second co-polarized signal to form a second MIMO layer signal in the first mode; and
   combining the first cross-polarized signal and the second cross-polarized signal to form the second MIMO layer signal in the second mode.

29. The dual-polarized multiple-input-multiple-output (MIMO) method of claim 27,
   wherein the switching is further based on a signal quality measurement of the first MIMO layer signal being less than a performance threshold.

30. The dual-polarized multiple-input-multiple-output (MIMO) method of claim 27,
   wherein the switching is further based on a beam scan angle of the first array of antennas.

* * * * *